(12) United States Patent
Kugelmass

(10) Patent No.: US 9,851,716 B2
(45) Date of Patent: *Dec. 26, 2017

(54) UNMANNED AERIAL VEHICLE AND METHODS FOR CONTROLLING SAME

(71) Applicant: Airphrame, Inc., San Francisco, CA (US)

(72) Inventor: Bret Kugelmass, San Francisco, CA (US)

(73) Assignee: Airphrame, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,774

(22) Filed: Dec. 5, 2016

(65) Prior Publication Data

US 2017/0131717 A1 May 11, 2017

Related U.S. Application Data

(63) Continuation of application No. 14/807,886, filed on Jul. 24, 2015, now Pat. No. 9,540,104, which is a continuation of application No. 14/726,106, filed on May 29, 2015, now Pat. No. 9,346,543, which is a continuation of application No. 14/204,634, filed on Mar. 11, 2014, now Pat. No. 9,075,415.

(Continued)

(51) Int. Cl.
  *G05D 1/00* (2006.01)
  *B64C 39/02* (2006.01)
  *G08G 5/00* (2006.01)

(52) U.S. Cl.
  CPC ......... *G05D 1/0088* (2013.01); *B64C 39/024* (2013.01); *G08G 5/0013* (2013.01); *G08G 5/0039* (2013.01); *B64C 2201/028* (2013.01); *B64C 2201/123* (2013.01); *B64C 2201/127* (2013.01); *B64C 2201/141* (2013.01)

(58) Field of Classification Search
  CPC ........ B64C 39/02; B64C 39/024; G05D 1/00; G05D 1/0088; G05D 1/10
  USPC ...................................................... 701/7, 11
  See application file for complete search history.

(56) References Cited

U.S. PATENT DOCUMENTS 6,711,475 B2 * 3/2004 Murphy ................ G01C 11/02
  701/3
9,257,048 B1 * 2/2016 Offer .................... G08G 5/0021

(Continued)

*Primary Examiner* — Thomas G Black
*Assistant Examiner* — Luke Huynh
(74) *Attorney, Agent, or Firm* — Run8 Patent Group, LLC; Peter Miller

(57) ABSTRACT

One variation of a method for imaging an area of interest includes: within a user interface, receiving a selection for a set of interest points on a digital map of a physical area and receiving a selection for a resolution of a geospatial map; identifying a ground area corresponding to the set of interest points for imaging during a mission; generating a flight path over the ground area for execution by an unmanned aerial vehicle during the mission; setting an altitude for the unmanned aerial vehicle along the flight path based on the selection for the resolution of the geospatial map and an optical system arranged within the unmanned aerial vehicle; setting a geospatial accuracy requirement for the mission based on the selection for the mission type; and assembling a set of images captured by the unmanned aerial vehicle during the mission into the geospatial map.

20 Claims, 7 Drawing Sheets

Related U.S. Application Data

(60) Provisional application No. 61/776,418, filed on Mar. 11, 2013.

(56) References Cited

U.S. PATENT DOCUMENTS

| | | | |
|---|---|---|---|
| 9,346,543 B2* | 5/2016 | Kugelmass | G05D 1/101 |
| 2014/0142785 A1* | 5/2014 | Fuentes | G05D 1/0011 |
| | | | 701/2 |
| 2016/0284221 A1* | 9/2016 | Hinkle | G08G 5/0034 |

* cited by examiner

UNMANNED AERIAL VEHICLE AND METHODS FOR CONTROLLING SAME

CROSS-REFERENCE TO RELATED APPLICATIONS

This application is a continuation application of U.S. patent application Ser. No. 14/807,886, filed on 24 Jul. 2015, which is a continuation of U.S. patent application Ser. No. 14/726,106, filed on 29 May 2015, which is a continuation of U.S. patent application Ser. No. 14/204,634, filed on 11 Mar. 2014, which claims the benefit of U.S. Provisional Application No. 61/776,418, filed on 11 Mar. 2013, all of which are incorporated in their entireties by this reference.

TECHNICAL FIELD

This invention relates generally to the field of unmanned aerial vehicles, and more specifically to a new and useful unmanned aerial vehicle and a system and a method for controlling the same in the field of unmanned aerial vehicles.

DESCRIPTION OF THE EMBODIMENTS

The following description of embodiments of the invention is not intended to limit the invention to these embodiments, but rather to enable any person skilled in the art to make and use this invention.

1. Unmanned Aerial Vehicle

Figure 1:
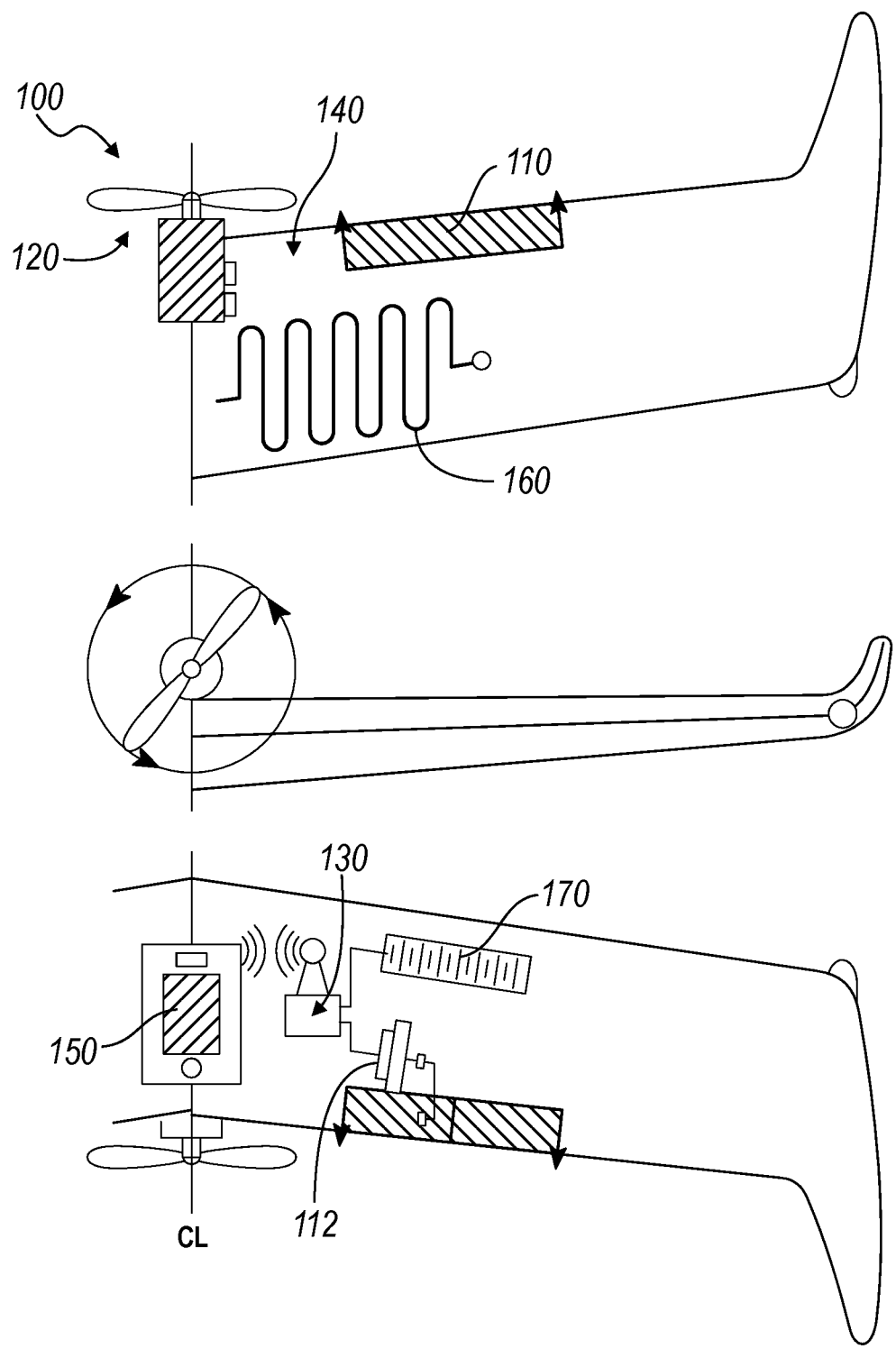
FIG. 1 is a schematic representation of an unmanned aerial vehicle of one embodiment of the invention.

As shown in FIG. 1, an unmanned aerial vehicle (UAV) too includes: flight control surfaces 110; actuators 112 configured to manipulate the flight control surfaces 110; a propulsion assembly 120; an autopilot module 130 configured to control the actuators 112 and the propulsion assembly 120; and a fuselage 140 configured to support the flight control surfaces 110, the actuators 112, the autopilot module 130, and the propulsion assembly 120, the fuselage 140 further configured to house a mobile computing device 150 with an optical sensor of the mobile computing device 150 directed outward from an unobstructed ventral side of the fuselage 140, the autopilot module 130 configured to receive a flight path communicated to the mobile computing device 150 over a wireless network.

Generally, the UAV 100 functions as an aerial drone configured to house a standalone mobile computing device 150, such as a smartphone or tablet, and to leverage imaging, communication, data storage, and data processing functionalities incorporated into the mobile computing device 150 to simplify design, construction, and programming of drones as well as communication with and distribution of data to and from drones. In one implementation, the UAV (i.e., drone) 100 is a surveillance drone that houses the mobile computing device 150 with a forward-facing camera of the mobile computing device 150 directed outward from the ventral side of the UAV 100. In this implementation, the UAV mobile computing device 150 assembly can thus fly without direct human control (e.g., based on a computer- or human-generated flight path), capture images of the ground and/or ground installations, store images with time, location, and/or orientation information, and transmit images and associated information wirelessly, such as over Wi-Fi or cellular communication protocol.

UAV 100 can incorporate standard drone, miniature, and/or scaled aircraft components and/or architecture(s). For example, the UAV 100 can be a battery-powered tailless fixed-wing aircraft with a wingspan under five feet (1.5 m) and a multi-blade prop attached to a brushless DC motor in a pusher configuration. In this example, the wing and fuselage 140 can be substantially physically coextensive and include a molded, extruded, or carved (i.e., cut) foam core strengthened with tape incorporating unidirectional fibers adhered in tension on the surface of the wing-fuselage 140 structure. In this example, the UAV 100 can further include an off-the-shelf autopilot module 130 that communicates with the mobile computing device 150 over a short-range wireless connection (e.g., low-energy radio communication), controls servos (i.e., the actuators 112) coupled to the flight control surfaces 110 via wired connections, and communicates with a brushless motor controller to control rotation of the prop and thus the speed of the UAV 100. However, the UAV 100 can be of any other form and include any other component(s) arranged in any other way.

The flight control surfaces 110 function to control the direction of the UAV too. The flight control surfaces 110 can include any one or more of an aileron, elevon, elevator, rudder, spoiler, flap, slat, air brake, trim tab, and/or other control surface. The flight control surfaces 110 can be arranged on one or more wings configured to generate lift, the flight control surfaces 110 configured to disrupt airflow over the wing(s) to rotate the UAV 100 about one or more axes, thus effecting the direction of motion of the UAV 100.

The actuators 112 are configured to manipulate the flight control surfaces 110 to change the direction of motion of the UAV 100 based on one or more control signals from the autopilot module 130. Each actuator can be a servo directly or indirectly coupled to one or more control surfaces, such as via a linkage, as shown in FIG. 1. However, the actuators 112 can be any other suitable type of actuator configured to apply a torque and/or force to a flight control surface to control the flight control surface in any other way.

The propulsion assembly 120 functions to generate thrust. The propulsion assembly 120 can thus include a rotary actuator and a propeller, as shown in FIG. 1. For example, the propeller can include two or three plastic injection-molded blades attached to an electric motor, such as a brushed DC motor or brushless DC motor, as described above. In this example, the electric motor can be controlled by a motor driver, brushless motor controller, or other controller that is a standalone device or incorporated into the autopilot module 130. Alternatively, the rotary actuator can be a gas- or fossil fuel-powered engine including a mechanical carburetor or fuel injection unit controlled with an electromechanical actuator (e.g., servo) or an electric fuel injection unit controlled with an electric fuel injection controller or driver, such as controlled by the autopilot module 130.

The propulsion assembly 120 can be arranged on the fuselage 140 and/or wing(s) of the aircraft in a pusher configuration (shown in FIG. 1) and/or a puller configuration. Furthermore, the propulsion assembly 120 can include multiple rotary actuators 112 and propellers, such as one rotary actuator and propeller suspended from the left and right wings of the UAV 100. Alternatively, the UAV 100 can include one rotary actuator and propeller assembly in a pushed configuration and one rotary actuator and propeller assembly in a puller configuration.

The fuselage 140 functions to support the flight control surfaces 110 (via one or more wings or booms), the actuators 112, the autopilot module 130, and the propulsion assembly 120. The fuselage 140 can further house a battery 170 or other energy storage system (shown in FIG. 1), a lighting system, additional sensors, a wireless radio (e.g., Wi-Fi, cellular) antenna, etc. As described above, the fuselage 140 can include a foam core with unidirectional wrap. Alternatively, the fuselage 140 can include a balsa, fiberglass, or carbon fiber exoskeleton or a balsa, aluminum, or plastic skeleton with stressed or unstressed skin (e.g., doped canvas). However, the fuselage 140 can be of any other form and include any other materials.

The fuselage 140 further functions to house a mobile computing device 150 with an optical sensor (e.g., a camera) of the mobile computing device 150 directed outward from an unobstructed ventral side of the fuselage 1400. As described above, the mobile computing device 150 can be a smartphone, a cellular phone, or a tablet. However, the mobile computing device 150 can be any suitable type of standalone computing device with imaging, wireless communication, data storage, and data processing functionalities. The fuselage 140 functions to support the mobile computing device 150 such that the optical sensor integrated into the mobile computing device 150 is properly oriented to capture images of the ground and/or ground installation during normal flight, i.e., with ventral side of the UAV too facing the ground and/or a target.

Thus, the UAV 100 can include a limited number of components necessary for flight, and the fuselage 140 can house a standalone, mass-produced, non-specialized device to enable specialized functionality. For example, flight paths can be communicated to the UAV too via the mobile computing device 150 that supports cellular, Wi-Fi, and/or other medium-to-long-range communication protocols, wherein the autopilot module 130 receives flight paths from the mobile computing device 150 over a short range (e.g., BTLE) communication protocol or over a wired connection to the mobile computing device 150. Furthermore, the UAV 100 can fly over a target path or installation and the mobile computing device 150 can capture, store, and transmit images to a computer network (e.g., a remote server), such as in real-time over cellular communication protocol and/or asynchronously (i.e., upon completion of the mission) over Wi-Fi communication protocol. The mobile computing device 150 can also incorporate sensors and communication modules that provide a level of redundancy suitable for a commercial installation of the UAV 100. For example, GPS location, pitch, yaw, roll, altitude, time, and other flight-related data collected and/or determined by the autopilot module 130 can be augmented, corrected, and/or audited with data collected and/or determined by a GPS sensor, GPS dock, accelerometer, gyroscope, and/or other sensor incorporated into the mobile computing device 150 installed into the UAV 100.

As shown in FIG. 1, one variation of the UAV too further includes a cellular antenna 160 (e.g., a cellular signal booster) to enable the mobile computing device 150 to transmit data over greater distances. For example, when the UAV 100 is used in remote locations (e.g., over dense forested area and/or in a national park), the cellular antenna 160 can enable the mobile computing device 150 to communicate image, vehicle location, and/or data wirelessly with a cellular tower twenty miles away. The cellular antenna 160 can be integrated into and/or arranged across a surface of the fuselage 140 and/or a wing of the UAV 100. Alternatively, the cellular antenna 160 can be an off-the-shelf cellular antenna 160 or signal booster installed within the wing or fuselage 140 of the UAV too. The cellular antenna 160 can be powered by a battery 170 that also powers the actuators 112 and/or the propulsion assembly 120, etc. and arranged within the fuselage 140 (or wing) of the aircraft. Alternatively, the cellular antenna 160 can be powered by the mobile computing device 150. However, the antenna can be any other suitable type of antenna incorporated into the UAV 100 and powered in any other way.

As shown in FIG. 1, one variation of the UAV 100 includes a battery 170 configured to power various components of the UAV 100, including the propulsion assembly 120. The battery 170 can be a lithium-ion, lithium-polymer, lithium-iron-phosphate, NiCd, NiMH, or any other suitable type of rechargeable battery. The battery 170 can be sized according to a weight, weight distribution, and/or energy capacity requirement of the UAV 100. For example, the battery 170 can be selected for an energy capacity that enables the UAV 100 to traverse a ground distance of up to sixty miles in low-wind conditions. The battery 170 can also include multiple discreet cells or discrete sets of cells arranged through the fuselage 140 and/or wing(s) to achieve a desired vehicle center of gravity and/or vehicle weight. However, the battery 170 can be any other type, arranged in any other way within the UAV 100, and selected according to any other power, size, and/or weight requirement.

2. First Method and Applications

Figure 2:
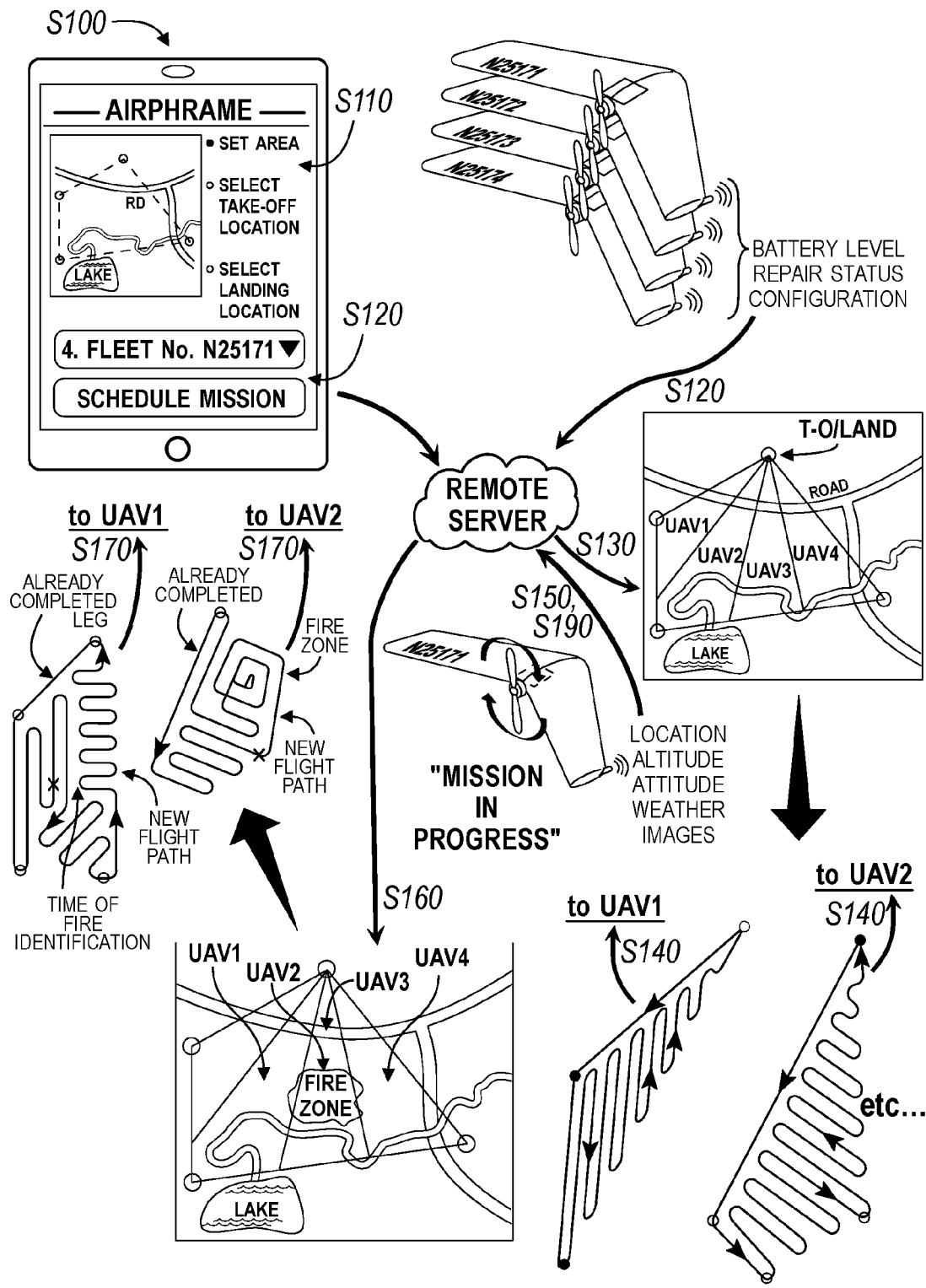
FIG. 2 is a flowchart representation of a first method of one embodiment of the invention.

As shown in FIG. 2, a method S100 for imaging a ground area includes: receiving an area selection corresponding to the ground area in Block S110; identifying each unmanned aerial vehicle (UAV) in a set of UAVs in Block S120; generating a unique flight path for each UAV in the set of UAVs in Block S130, each flight path specifying a landing condition; transmitting each flight path to a respective UAV in the set of UAVs in Block S140; wirelessly monitoring each UAV in the set of UAVs during implementation of a respective fight path in Block S150; modifying flight paths in real time according to failure of a UAV in the set of UAVs to achieve a respective flight path in Block S160; and transmitting modified flight paths to respective UAVs in the set of UAVs in Block S170.

Generally, the method functions to control a fleet (i.e., set) of UAVs in real-time based on a ground area or ground installation specified by a user and real-time flight conditions of the UAVs in the fleet. The method plots flight paths, including a landing condition, for imaging-enabled UAVs in the fleet based on a mission that specifies the ground area or ground installation to be imaged. The method then pushes the flight paths to respective UAVs prior to initiation of the mission. Once the UAVs are launched and the mission begins according to the initial flight paths, the method monitors environmental conditions proximal the UAVs (e.g., through sensors aboard the UAVs) and/or UAV data (e.g., GPS location, altitude, attitude, range) and, when pertinent to completion of the mission, recalculates the flight path of at least one UAV to compensate for environmental changes and/or UAV status changes that occur during the mission.

Therefore, the method can enable fulfillment of an imaging request over a specified ground area or ground installation with multiple UAVs through real-time flight path adjustment based on current environmental and/or UAV conditions.

Figure 3:
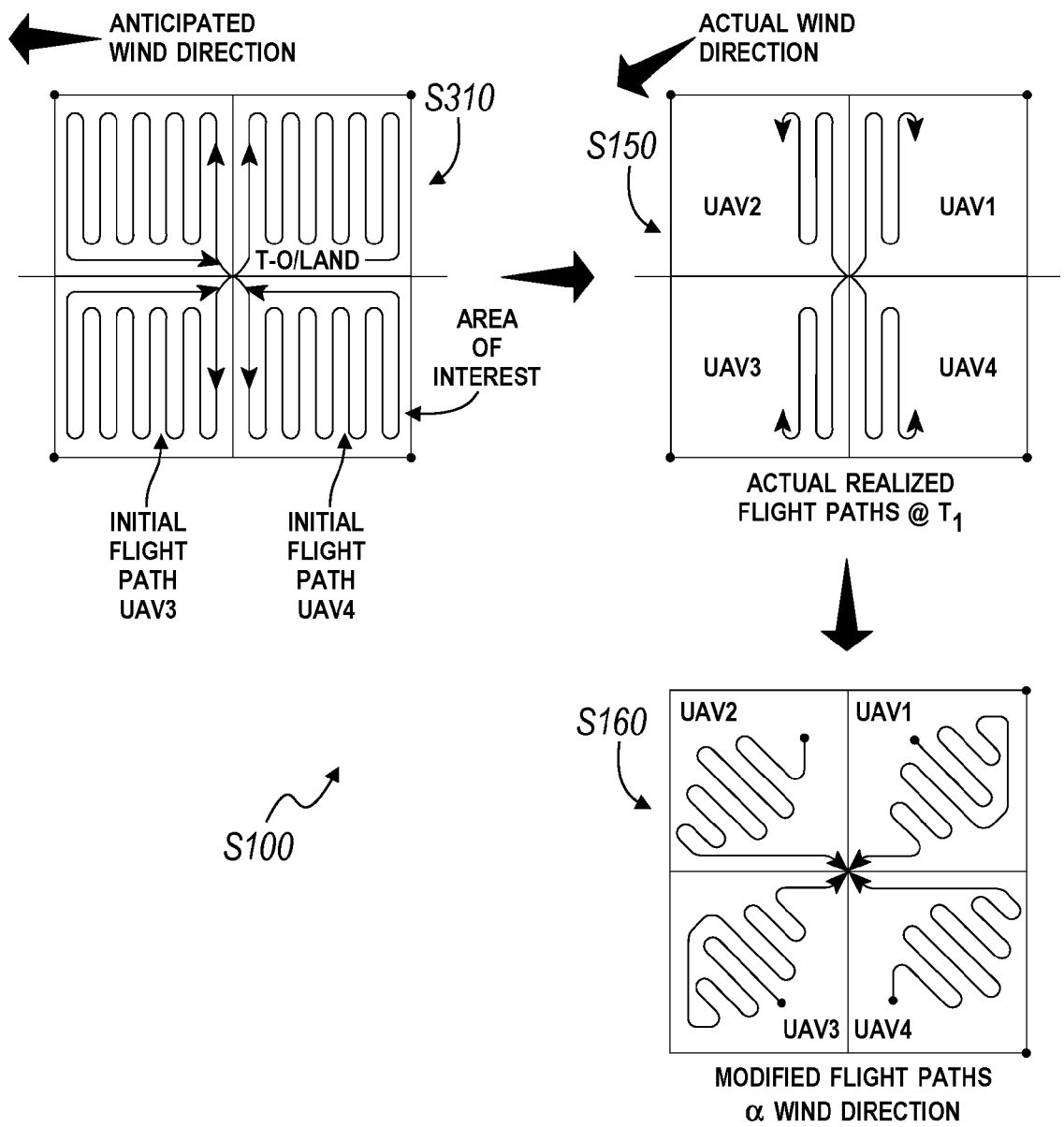
FIG. 3 is a flowchart representation of one variation of the first method.

The method can be particularly applicable to small, unmanned aircraft, such as the UAV too described above, wherein the UAVs are relatively small and thus sensitive to changing environmental conditions (e.g., rain, wind) and/or of relatively minimal range (e.g., forty miles). For example, for a fleet of four UAVs with a maximum range of forty miles in calm weather and for a mission specifying imaging of an eight-mile by eight-mile tract of land, the method can assign one quadrant of the square tract to each UAV, specify a flight origin (i.e., a takeoff site) and return location (i.e., a landing site) at the center of the tract, specify an altitude of 1,000 feet, and specify a serpentine flight path in each quadrant with one half-mile between long sides of the serpentine, as shown in FIG. 3. In this example, the method can push these initial flight paths to the UAVs prior to launch. Furthermore, during the mission, if a first UAV senses significant local winds in an assigned first quadrant, the method can adjust flight paths of UAVs in the second, third, and fourth quadrants to cover portions of the first quadrant and reduce the area of the first quadrant to be imaged by the first UAV accordingly. Alternatively, if the UAVs sense significant low-altitude winds across the entire tract, the method can reset the altitude of the mission to 3,000 where winds are less significant and increase imaging resolution of an onboard camera accordingly. Similarly, as shown in FIG. 3, if the direction of the wind over the area of interest changes substantially from a predicted wind direction, the method can modify the flight paths of the UAVs such that the UAVs fly substantially parallel to the direction of the wind. However, the method can be applicable to any other type of UAV flying in any other environment or through any other environmental condition.

Figure 5:
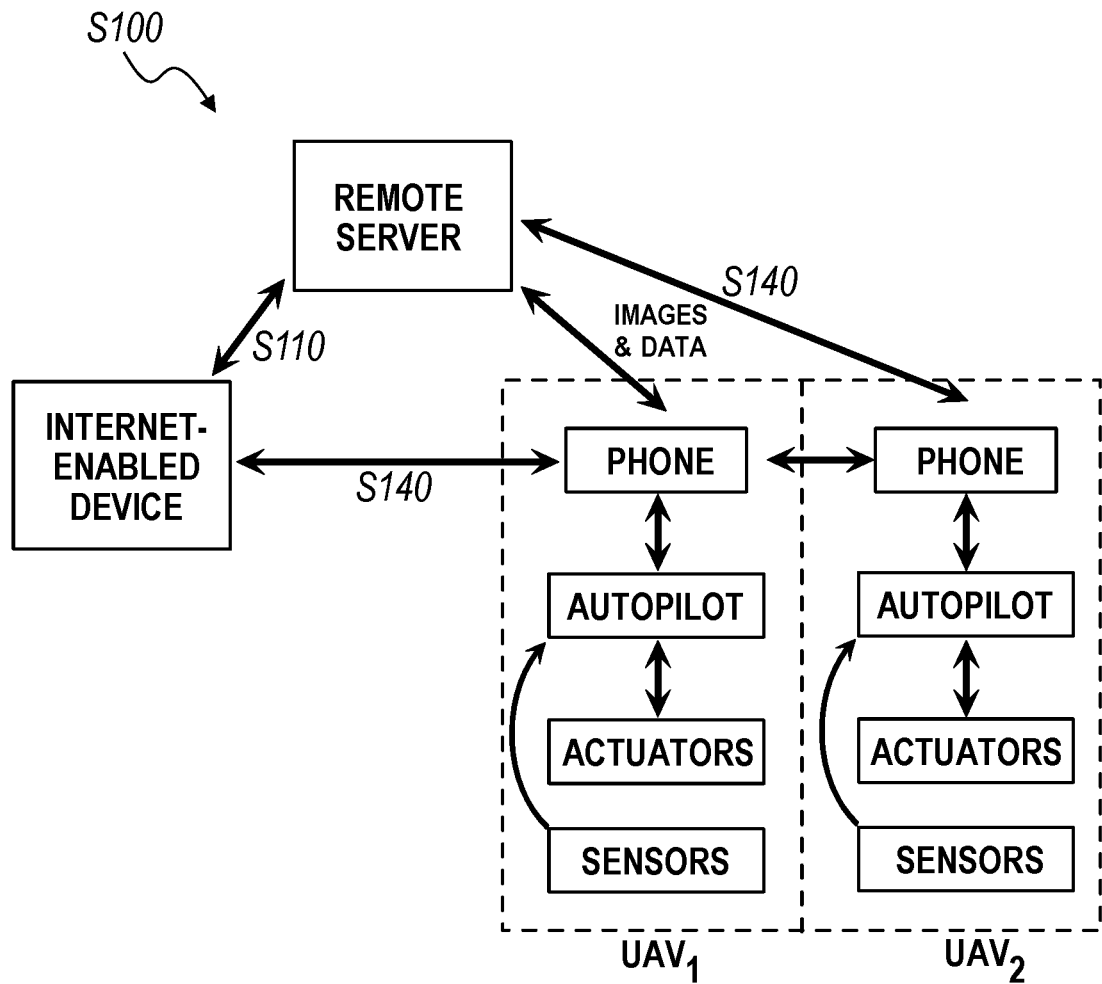
FIG. 5 is a flowchart representation of one variation of the first method.

As shown in FIG. 5, the method can be implemented by a remote computer system that controls a set (i.e., one or more) of UAVs remotely according to a selected ground area or installation for imaging and a real-time UAV status. The computer system can be a cloud-based computer (e.g., Amazon EC2), a mainframe computer system, a grid-computer system, or any other suitable computer system. For example, the computer system can be a remote server that communicates with one or more UAVs over HTTP (or TCP or UDP) protocols through a web service (e.g., Amazon AWS). The computer system can thus transmit data (e.g., commands, flight paths, UAV location) to and from a UAV over a cellular, Wi-Fi, satellite, or other suitable wireless network. Alternatively, the method can be implemented on a local computing device. For example, a local flight control station, specific to the fleet of UAVs and including a wireless radio, can implement the method and communicate with the UAVs directly over the wireless radio to complete the mission. Yet alternatively, the method can be implemented on a mobile computing device 150 (e.g., smartphone) arranged in one UAV within the fleet, wherein the UAV functions as a master to control other vehicles in the fleet. Similarly, the method can be implemented on mobile computing devices arranged in multiple UAVs within the fleet, the mobile computing devices thus forming a distributed airborne network of computing devices that controls the fleet. However, the method can be implemented by any combination of a remote computer system, a local flight control station, or one or more mobile computing devices arranged in one or more UAVs within the fleet. For example, in a default setting, the method can be implemented by the remote computer system but, when long-range wireless (e.g., cellular) communication with the fleet is lost, a mobile computing device 150 in one UAV in the fleet can assume a master setting and implement remaining elements of the method until long-range wireless communication is regained. However, the method can be implemented in any other suitable way.

2.1 Ground Area

Block S110 of the method recites receiving an area selection corresponding to the ground area. Generally, Block S110 functions to receive a request to image a particular ground area and/or ground installation. Block S1100 can receive the selection through a user interface implemented on a website, a native application executing on a personal or company-issued computing device (e.g., a smartphone, laptop, tablet, desktop computer), a specialized local flight control station, or any other suitable device. In one example, the user interface depicts a map, and Block S110 receives mouse or touch selections for vertices of a polygon, wherein Block S110 connects the vertices by straight lines to form a polygon encompassing the area to be imaged, or the "area of interest," as shown in FIG. 2. In a similar example, Block S110 receives GPS coordinates for three or more vertices through the user interface and connects the vertices by straight lines to form a polygon encompassing the area of interest. In another example, Block S110 receives a street address through the user interfaces, accesses public land records, and defines the area of interest as the area within the property line specified in the public land records. In a further example, Block S110 receives two coordinates, or mouse or touch selections, on a map and defines the area of interest along a straight line between the two coordinates and specified width centered across the straight line.

Block S110 can also receive take-off and/or landing criteria, as shown in FIG. 2. For example, Block S110 can receive a mouse or touch selection for a proposed take-off and landing area near a road or clearing. Block S110 can also set a take-off and/or landing direction based on local obstacles or common or predicted wind directions. However, Block S110 can receive the area selection and take-off and/or landing requirements in any other way to define mission attributes.

2.2 UAV Selection

Block S120 of the method recites identifying each UAV in a set of UAVs. Generally, Block S120 functions to capture relevant information of each UAV in the fleet that is allocated to perform the mission. For example, Block S120 can retrieve identification information (e.g., an "N-number"), battery or power level, total flight time or age, repair status, current equipment status (e.g., motor type, battery type, installed mobile computing device model), etc. of each UAV. By collecting relevant UAV information from a fleet of UAVs, Block 220 can thus enable control of multiple UAVs from a single computing device, such as smartphone or laptop carried by a user, in order to complete an imaging mission. Block S220 can similarly enable control of multiple UAVs through a computing device connected to a computer network, the computing device supporting a user interface to collect flight parameters from a user, as described below.

In one implementation, Block S120 retrieves UAV information when the UAVs are brought to a take-off site and turned "ON." For example, when the UAVs in the fleet are turned "ON," each UAV can sync' with a computer network (e.g., a remote server) implementing the method, such as over a cellular, Wi-Fi, or other communication channel, thereby passing current information specific to each UAV to the remote server, such as serial number, battery level, and flight hours. In another implementation, the user can access a UAV account (i.e., through the user interface) to select a UAV fleet, from a list of available UAV fleets, for the mission.

Block S120 can also record a user selection for one or more UAVs—from a list of available UAVs—to build the UAV fleet for the mission. For example, Block S120 can recommend one or more available UAVs and present these recommendations to the user through a user interface accessible on a computing device connected to the computer network based on information specific to the available UAVs and to the mission. Based on a user UAV selection(s), Block S120 can also access relevant UAV data from a UAV database and pass these data to Block S130 for application in generating flight paths for the UAVs. Furthermore, in response to the UAV selection, Block S120 can ping each mobile computing device in each selected UAV to retrieve battery, repair, location, and/or other relevant real-time information from the selected UAVs. Block S120 can also retrieve UAV-related information entered manually by a user. However, Block S120 can function in any other way to identify each UAV in a set of UAVs.

2.3 Flight Path

Block S130 of the method recites generating a unique flight path for each UAV in a set of UAVs, each flight path specifying a take-off and landing condition. Generally, Block S130 functions to set an initial flight plan for each UAV based on the ground area of interest and UAV-related information collected in Block S120. In a first example shown in FIG. 4, Block 8110 receives a ground area that specifies a forty-mile stretch of highway (e.g., between mile markers 100 and 140), and Block S120 identifies ten UAVs in a fleet allocated to monitor the stretch of highway over a two-hour period. In this example, Block S130 can allocate miles 100-104 to a first UAV, miles 104-108 to a second UAV, miles 108-112 to a third UAV, miles 112-116 to a fourth UAV, and so on. Block S130 can also set a take-off and landing zone for the first and second UAVs at mile marker 104, a take-off and landing zone for the third and fourth UAVs at mile marker 108, and so on. In a second example, Block S110 receives a ground area that specifies a ten-mile by ten-mile area of densely-forested land and a take-off and landing location at one corner of the land area, and Block S120 identifies ten UAVs in a fleet allocated to image the land area. In this example, Block S130 can generate ten flight paths with approximately (scalene) triangular flight zones with common vertices at the take-off and landing location and substantially similar areas (similar to flight paths shown in FIG. 2).

Block S130 can further account for data (i.e., image) collisions between images (i.e., overlapping images) to be gathered by the UAVs during the mission and recent images gathered in other missions. In the second example above, if a two-mile by two-mile corner of the ten-mile by ten-mile area of densely-forested land was imaged the previous day during another mission, Block S130 can remove the two-mile by two-mile corner from the area of interest and set the flight paths of each UAV accordingly to reduce total mission time and/or increase image density (i.e., number of images captured per second or per land mile) over the remaining portion of land area. In this example, once the mission is complete, the method can augment images from the mission with images from the previous mission to complete the set of images for the total ten-mile by ten-mile land area. However, Block S130 can account for a time sensitivity of images collected by the mission (i.e., necessity for "brand new" images) in determining if previous mission images overlap to the current mission, thereby ensuring that images of the total land area specified in the mission are reliably current.

Block S130 can also account for an initial charge (i.e., battery) status and/or flight range of each UAV in the fleet. For example, the fleet of UAVs, each with different flight ranges, Block S130 can set shorter total flight paths (e.g., ground area to image) for UAVs with shorter ranges and longer total flight paths for UAVs with longer ranges. Block S130 can similarly account for weather and/or wind conditions in setting initial UAV flight paths. For example, Block S130 can specify longer total flight paths (e.g., greater ground areas to image) for UAVs in the fleet that will fly substantially parallel to actual or predicted wind directions and shorter total flight paths for UAVs in the fleet that will fly substantially perpendicular to the wind direction. Block S130 can further account for current UAV configuration or construction. For example, Block S130 can assign older UAVs with more flight hours, lower-capacity batteries, older mobile computing devices, etc. to portions of an area to image that require less image resolution or density, are historically less windy, are at lower altitude, etc.

Block S130 can further account for high-latency (e.g., image) data transferring options. For example, Block S130 can identify a wireless communication hub (e.g., cellular tower) within or near the area of interest and thus define a return leg of each flight path that brings a respective UAV substantially near the wireless communication hub to offload data (e.g., images) to the hub. Therefore, Block S130 can tailor each flight path for each UAV allocated to fly the mission based on current UAV status, environmental conditions, geography of the area to image, available take-off and/or landing sites, and/or wireless communication hubs and data offloading options. However, Block S130 can account for any other relevant factor in generating a flight path for each UAV in the set of UAVs allocated for the mission.

2.4 Communications

Block S140 of the method recites transmitting each flight path to a respective UAV in the set of UAVs. Generally, Block S140 functions to transmit a respective flight path to each UAV in the fleet of UAVs assigned to the mission prior to take-off. As described above, Block S140 can communicate data, including flight paths, to mobile computing devices arranged in the UAVs via Wi-Fi, cellular, or other long-range wireless communication channels. Data, including flight paths, can be communicated over HTTP, TCP, UDP, or other Internet or cellular communication protocol. In one implementation in which mission definitions are set in advance of arrival at the launch site, such as hours, days, or weeks ahead of time, Block S140 transmits each flight path to a mobile computing device in a respective UAV once the flight paths are generated in Block S130. In another implementation, though the mission may be defined hours, days, weeks, etc. prior, Block S130 withholds calculation of the flight paths until the UAVs are brought to the site, thereby enabling Block S130 to collect current pertinent environmental and/or UAV information that can be applied to the calculation of the flight paths, and Block S140 can transmit the flight paths to the mobile computing devices in respective UAVs once the flight paths are determined or the UAVs are turned on. Therefore, the flight paths for the mission can be preloaded to the UAVs or uploaded just prior to initiation of the mission. However, Block S140 can transmit each flight path to each respective UAV in any other way and according to any other schedule, trigger, or event.

Block S150 of the method recites wirelessly monitoring each UAV in the set of UAVs during implementation of a respective fight path. Generally, Block S150 functions to collect any one or more of current location (i.e., GPS coordinates), altitude, attitude (e.g., pitch, yaw, roll), battery or charge level, repair status, local barometric pressure, ambient lighting, wind speed, air temperature, moisture data, or any other relevant metric of one or more UAVs or conditions proximal one or more UAVs. Block S150 can receive this information from one or more sensors arranged in a UAV in the fleet, such as a sensor integrated into an autopilot module 130 (including location, altitude, and attitude sensors) in the UAV, sensors integrated into the mobile computing device arranged in the UAV, or additional discrete sensors arranged on or integrated into a fuselage 140 or wing of the UAV.

Block S150 can receive such data funneled through a mobile computing device arranged in respective UAVs and transmitted wirelessly, such as to a remote server over a cellular network. Block S150 can implement low-latency communication techniques to obtain current UAV and/or environmental data substantially immediately, thereby enabling substantially real-time UAV tracking and substantially real-time changes to flight paths in Block S160. Block S150 can ping the mobile computing device for current data every half-second, every second, every five seconds, or according to any other schedule.

As Block S150 receives UAV and environmental data over time during the mission, Block S150 can compare current data with previous data received during the mission to plot actual UAV flight path and/or to estimate any of battery drainage rate, actual UAV speed and direction, wind speed and direction (shown in FIG. 3), or any other relevant metric of a UAV or local environmental condition. Block S150 can compare any of these data or metrics to UAV and/or local environment models implemented in Block S130 to generate modified flight paths for the UAVs. In response to a significant deviation between a UAV or environmental model and actual UAV or environmental data, Block S150 can trigger Block S160 to modify one or more flight paths and/or UAV settings. Additionally or alternatively, Block S150 can compare the initial flight path transmitted to a UAV with an actual flight path of the UAV measured during the mission and, in response to a significant deviation between the initial and actual flight paths, trigger Block S160 to modify the flight path of the UAV and any other UAV pertinent to completing the mission. However, Block 150 can function in any other way to wirelessly monitor each UAV in the set of UAVs during implementation of a respective fight path.

As each UAV executes the flight path specified in Block S130 (and subsequently Block S160), the method can collect images captured by a respective UAV and downloaded to the computer system (e.g., remote server). In this implementation, Block S150 can further implement machine vision to analyze various images from UAVs throughout the mission to identify areas of interest within the ground area of interest. In the example above, in which the area of interest is a ten-mile by ten-mile forested area, Block S150 can implement machine vision to identify, in an image captured by a UAV, a fire within the area. In this example, Block S150 can trigger Block S160 to modify flight paths to focus more heavily (i.e., increase image resolution and/or density) over the fire. In the example in which the area of interest is a highway, Block S150 can implement machine vision to identify, in an image captured by a UAV, a traffic accident or traffic jam. In this example, Block S150 can trigger Block S160 to modify flight paths to focus more heavily (i.e., increase image resolution and/or density) over the accident or around the leading and trailing edges of traffic congestion. However, Block S150 can function in any other way and implement any suitable machine vision and/or machine learning technique to identify points of interest within the area of interest and trigger Block S160 to modify flight paths accordingly.

2.5 Flight Path Adjustment

Block S160 of the method recites modifying flight paths in real time according to failure of a UAV in the set of UAVs to achieve a respective flight path. Generally, Block S160 functions to analyze UAV and environmental data collected and/or extrapolated in Block S150 and to calculate new flight paths necessary to complete the mission accordingly. Block S160 can additionally or alternatively adjust imaging or other UAV parameters to accommodate for environmental changes, identified points of interest within the area to be imaged, changing UAV statuses, etc.

Figure 4:
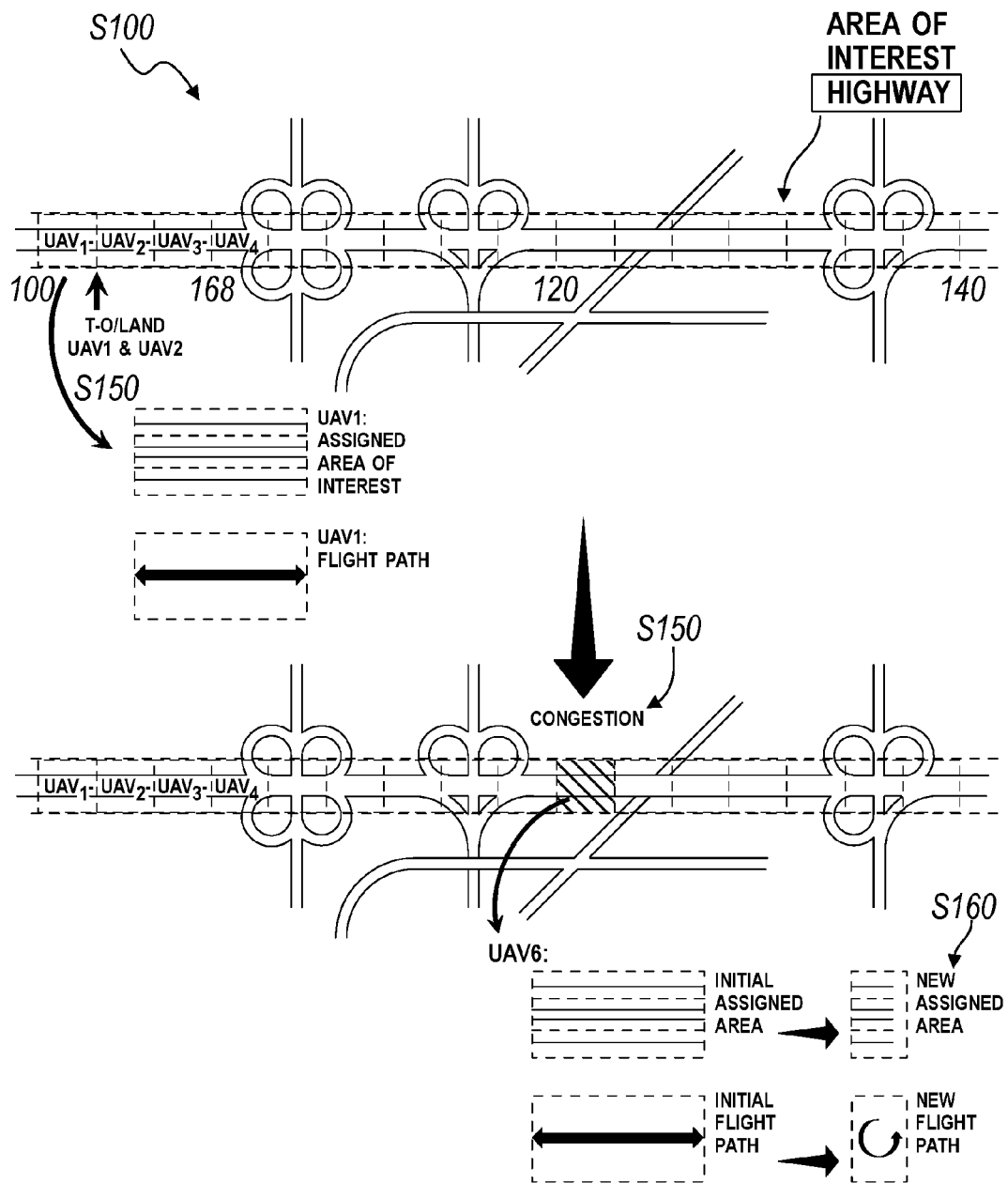
FIG. 4 is a flowchart representation of one variation of the first method.

In the example described above in which the area of interest is a highway with an identified point of interest that is an accident, Block S150 can assign a greater distance of the highway to a first UAV furthest from the accident, assign low image resolution and/or low image density to a second UAV over low-congestion area, assign a third UAV (initially assigned to a stretch of highway including the accident) to circle the accident and capture high-resolution images at a high image capture rate, as shown in FIG. 4, and shift flight paths of adjacent fourth and fifth UAVs to cover the area of highway no longer imaged by the third UAV.

In the example described above in which the area of interest is a ten-mile by ten-mile forested area with an identified point of interest that is a fire, Block S160 can redefine image areas assigned to each UAV from a triangular area with one vertex at the take-off and landing site to a triangular area with one vertex proximal a center of the fire. Block S160 can also modify the flight path of a UAV in the fleet to circle the fire zone, as shown in FIG. 2. In this example, Block S160 can also set decreased UAV speed, increased image resolution, and/or increased image density (e.g., per land mile) for UAVs that approach the fire zone.

In yet another example, as wind conditions change locally, Block S160 modifies the image capture rate (i.e., image density) and cutback distance (i.e., distance between long legs of a serpentine) of the respective flight path of the UAV, as shown in FIG. 3. In this example, the initial flight path for the UAV can be generated in Block S130 for a no wind or direct headwind condition. However, in a crosswind, an autopilot module 130 onboard the UAV can point the UAV in the direction of the crosswind in order to stay on the predefined flight path. The mobile computing device, which is rigidly mounted to the UAV, therefore captures images off axis of the flight path (or UAV direction). Block S160 can thus adjust the image capture rate and cutback distance to maintain a predefined overlap of subsequent images (e.g., 50%). In particular, for greater crosswinds perpendicular to the flight path, the UAV can orient at a greater angle from the flight path to compensate for the crosswind, and Block S160 can reduce image capture rate and decrease cutback distance accordingly.

In a further example, if a UAV in the fleet of UAVs is damaged or downed (e.g., lost) during the mission, Block S160 can modify flight paths of one or more other UAVs in the fleet to compensate, including redirecting one or more UAVs over a subset of the area of interest initially assigned to the downed UAV.

In one implementation, Block S110 further functions to receive a mission update from a user, including updated imaging parameters (e.g., resolution, density, size, overlap percentage, redundancy requirements, colors or filters) and/or an updated area of interest. For example, if a user reduces the area of interest or selects a particular point of focus within the area of interest, Block S160 can return one UAV to the ground and redirect remaining UAVs to the reduced area of interest. In another example, a user can select a different landing location, and Block S160 can change the flight paths of the UAVs to enable the UAV to reach both the landing zone and remaining area of the area of interest under current power levels. Similarly, Block S160 can select a different landing location or adjust a landing direction based on current wind speed and/or direction proximal the initial landing location.

In another example, Block S150 can collect local weather information and, when rain is detected in the area of interest, Block S160 can ground aircraft not suitable for wet flights (e.g., not waterproofed). However, Block S160 can modify one or more flight paths, imaging parameters, or mission detail in any other way, according to any other schema, and in response to any other data, metric, or event.

Block S170 of the method recites transmitting modified flight paths to respective UAVs in the set of UAVs. Generally, Block S170 implements methods and/or techniques of Block S140 to transmit an updated flight path (output in Block S160) to one or more UAVs in the fleet while the mission is in progress.

Block S150, S160, and S170 can repeat throughout the mission to respond to changing UAV conditions, environmental conditions, mission details, etc. as the mission progresses.

2.6 Master UAV

One variation of the method includes Block S180, which recites setting a master UAV in the set of UAVs in response to loss of communication with a wireless communication hub. Generally, Block S180 functions to transfer responsibility of at least some of Blocks of the method to one or more master UAVs in the fleet if communication with the computer system (e.g., remote server) fails or is slowed to a speed below a threshold latency for UAV flight control. For example, Block S180 can switch to a master UAV mode if communication with a cellular tower slows due to high call volume through the cellular tower or if a power outage shuts down a Wi-Fi router. In this variation, a master UAV in the fleet can communicate with other UAVs in the fleet via short- or mid-range communication channels, such as over low-energy radio communication. For the fleet that includes several UAVs dispersed over the area of interest, the method can daisy-chain communications across UAVs, thereby enabling data communication between the master UAV and a second UAV out of range of the master UAV by passing data through a third (and fourth, and fifth, etc.) UAV within range of both the master and the second UAVs.

In one implementation, Block S180 transfers control of the mission to a master UAV, thus enabling the fleet to complete the mission with a break in communication with the remote server. In this implementation, Block S180 can also set multiple master UAVs within the fleet such that the master UAVs form a distributed airborne network of mobile computing devices that controls the fleet. Alternatively, Block S180 transfers control of the mission to the master UAV to calculate and distribute emergency landing procedures to UAVs in the fleet, thus canceling the mission. However, Block S180 can function in any other way to set a master UAV in the set of UAVs in response to loss of communication with a wireless communication hub.

2.7 Image Offloading

One variation of the method includes Block S190, which recites wirelessly retrieving images and image meta data from a UAV in the fleet during the mission. Because timely collection of images and related meta data is not necessarily imperative to realization of the flight path of a UAV during the mission, Block S190 can receive images and related data with a relatively high degree of latency compared with UAV location, battery level, wind speed, etc. implemented in Block S160 to modify one or more UAV flight paths in real time. Therefore, Block S190 can receive image and meta data at a relatively low data transfer rate throughout the flight, can receive image and meta data at the conclusion of the mission, can receive image and meta data when a UAV has completed an imaging portion of the flight path and proceeds to fly around a cellular tower, etc. Additionally or alternatively, each UAV can prioritize transmission of flight- and environment-related data over transmission of images and related meta data. However, Block S190 can receive images and related data according to any other timing and/or schema.

Each image captured by a UAV in the fleet during the mission can be a digital photograph captured by a camera integrated into the mobile computing device installed in the UAV. However, the image can be any other suitable type of digital image captured in any other way by the UAV or by a system installed on or in the UAV. Furthermore, the image can be filtered, cropped, or adjusted in any other way by the mobile computing device prior to wireless retrieval of the image in Block S190. However, Block S190 can function in any other way to wirelessly retrieve images and image meta data from a UAV in the fleet during the mission.

In one implementation, when the mobile computing device installed in the UAV captures an image, the mobile computing device also tags the image with meta data. Generally, this meta data can include a GPS timestamp and GPS coordinates output by a GPS sensor integrated into the mobile computing device, as well as an attitude of the mobile computing device (and thus the UAV) based on an output of an inertial sensor integrated into the mobile computing device. For example, the mobile computing device can include a 3-axis accelerometer and a 3-axis gyroscope, and the mobile computing device can analyze outputs of the accelerometer and gyroscope to calculate a pitch, yaw, and roll (i.e., attitude) of the aircraft, all of which can be assigned to the image. Prior to transmission of the image to the remote server, the mobile computing device can retrieve a UAV location and attitude data, measured by sensors integrated into an autopilot module 130 installed in the UAV, based on the GPS timestamp assigned to the image. Thus, the mobile computing device can tag the image with redundant (and higher accuracy) location, altitude, and attitude data of the UAV at the time the image was captured by matching a GPS time stamp assigned by the GPS sensor in the mobile computing device with a GPS timestamp assigned by the GPS sensor in the autopilot module 130. The mobile computing device can also tag the image with an output from a standalone barometer installed in the UAV to improve accuracy of an altitude measurement generated by the autopilot module 130 and stamped on a respective image. Data from other discrete sensors installed or integrated into the UAV, such as a temperature sensor, a pitot tube or other wind speed sensor, a moisture sensor, a proximity sensor, a radar detector, etc. In this implementation, image meta data generated by the sensors in the mobile computing device can be secondary to image meta data generated by sensors in the autopilot module 130 and/or discrete sensors arranged within the UAV. Alternatively, Block S190 can retrieve the image with meta data generated solely by sensors in the mobile computing device, and the remote server can access stored autopilot data and retroactively add autopilot data and/or measurements from other discrete sensors to the image based on GPS timestamps as described above.

Therefore, in the foregoing implementation, the UAV, the (mobile) computing device, and/or the computer network (e.g., the remote server) can: capture an image through an optical sensor incorporated into a mobile computing device arranged in a UAV; assign attitude data to the image, the attitude data measured by an inertial sensor when the image was captured, the inertial sensor incorporated into the mobile computing device; assign a timestamp to the image based on a GPS time output of a GPS sensor when the image was captured, the GPS sensor incorporated into the mobile computing device; retrieve primary attitude, altitude, and location data recorded by an autopilot module 130 based on the timestamp assigned to the image, the autopilot module 130 arranged in the UAV; and assign the primary attitude, altitude, and location data to the image. However, the UAV, mobile computing device, and/or remote server can function in any other way to assign meta data to an image of a ground area of interest captured during a mission.

3. Second Method and Applications

Figure 6:
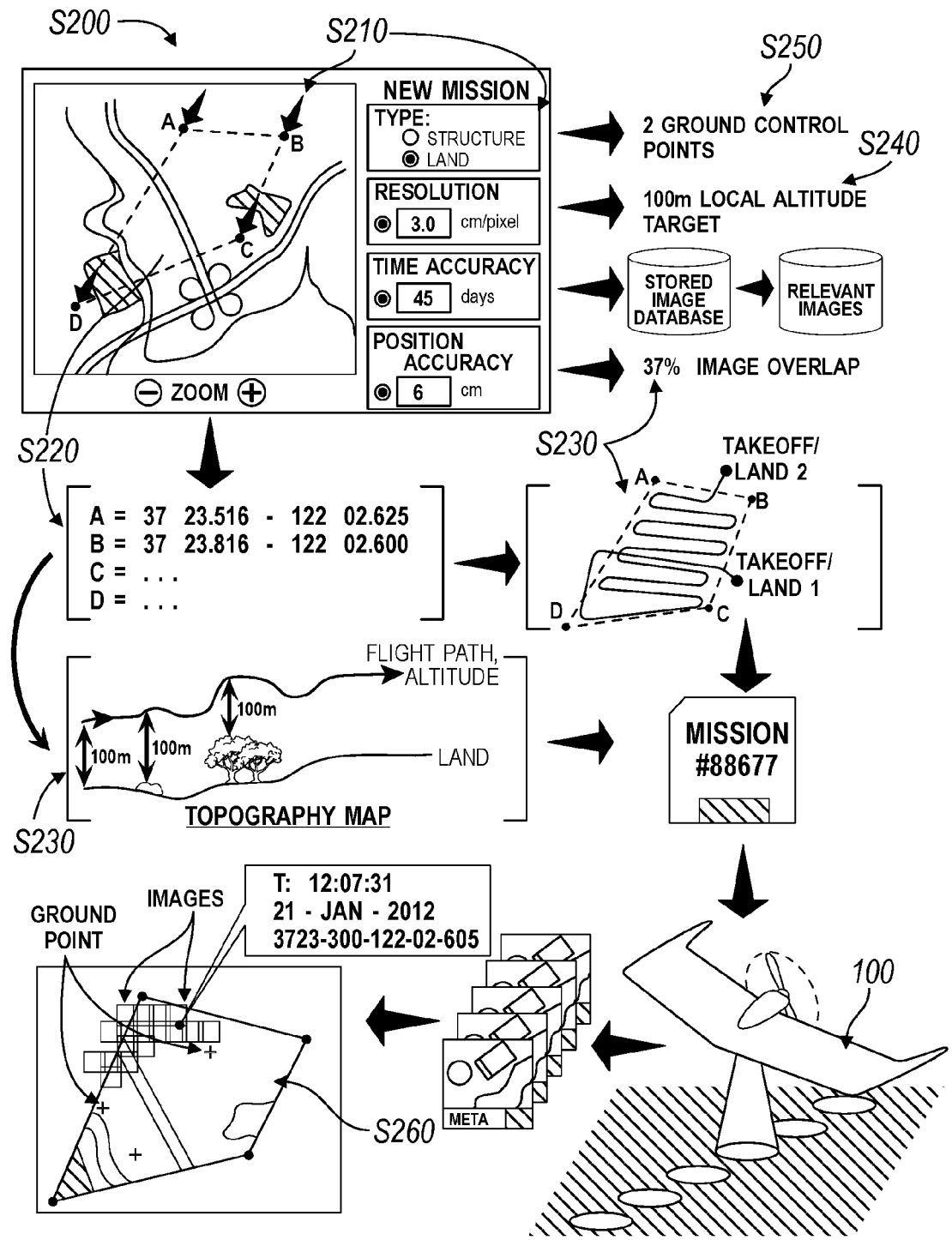
FIG. 6 is a flowchart representation of a second method of one embodiment of the invention.

As shown in FIG. 6, a second method S200 for imaging a ground area includes: within a user interface, receiving a selection for a mission type, receiving a selection for a set of interest points on a digital map of a physical area, and receiving a selection for a resolution of a geospatial map in Block S210; identifying a ground area corresponding to the set of interest points for imaging during a mission in Block S220; generating a flight path over the ground area for execution by an unmanned aerial vehicle during the mission in Block S230; setting an altitude for the unmanned aerial vehicle along the flight path based on the selection for the resolution of the geospatial map and an optical system arranged within the unmanned aerial vehicle in Block S240; setting a geospatial accuracy requirement for the mission based on the selection for the mission type in Block S250; and assembling a set of images captured by the unmanned aerial vehicle during the mission into the geospatial map based on the geospatial accuracy requirement in Block S260.

One variation of the second method S200 includes: within a user interface, receiving a selection for a set of interest points on a digital map of a physical area and receiving a selection for a resolution of a geospatial map in Block S210; identifying a ground area corresponding to the set of interest points for imaging during a mission in Block S220; generating a first flight path over a first portion of the ground area for execution by a first unmanned aerial vehicle during the mission in Block S230; generating a second flight path over a second portion of the ground area for execution by a second unmanned aerial vehicle during the mission in Block S230; setting a first altitude for the first unmanned aerial vehicle along the first flight path based on the selection for the resolution of the geospatial map and an optical system arranged within the first unmanned aerial vehicle in Block S240; setting a second altitude for the second unmanned aerial vehicle along the second flight path based on the selection for the resolution of the geospatial map and an optical system arranged within the second unmanned aerial vehicle in Block S240; and stitching a first set of images captured by the first unmanned aerial vehicle and a second set of images captured by the second unmanned aerial vehicle during the mission into the geospatial map in Block S260.

Generally, the second method S200 functions to automatically generate a flight path over a ground area for one or more UAVs and to assemble images of the ground area collected by the one or more UAVs into a geospatial map based on imaging needs specified by a user (e.g., a customer). In particular, the second method S200 can receive a mission type, a set of interest points defining the ground area, and/or a resolution, a time accuracy, a position accuracy, and/or a geographic coordinate system of a geospatial map, etc. such as through a user interface accessible on a computing device (e.g., a desktop computer, a smartphone, a tablet) connected to a computer network. The second method S200 can then identify the area of interest (i.e., the ground area), select one or more UAVs capable of imaging the area of interest at the selected resolution of accuracy, set a flight altitude for the selected UAV(s), generate a flight path over the area of interest for each of the UAV(s), and then queue the mission for later execution according to the user-entered imaging requirements. Once the mission is completed by the UAV(s), the second method S200 can collect the images captured by the UAV(s) and automatically assemble these images into a geospatial visual map that meets the parameters (e.g., resolution, time accuracy, position accuracy, geographic coordinate system) elected by the user.

One or more Blocks of the second method S200 can therefore implement methods or techniques described above in first method S100 to generate a flight plan for each of one or more UAVs too described above, and the UAVs can execute (and modify in real-time) their corresponding flight plans to capture a series of images of the area of interest and upload these images to a computer network, as described above. Blocks of the second method S200 executing on the computer network or on a computing device connected to the network can thus stitch these images into an orthorectified geospatially-accurate visual map and/or into a three-dimensional geospatially accurate point cloud.

The second method S200 can therefore execute within a command center supporting order submission for custom geospatial visual maps of user-elected areas at user-elected resolution, accuracy, precision, etc. As described above, the second method S200 can automatically generate a flight path for each of one or more UAVs within a single mission and generate a visual map accordingly based on parameters entered with an order submitted by a user. For example, the second method S200 can output an orthorectified geospatially-accurate visual map (and/or into three-dimensional geospatially accurate point cloud) with pixels (or groups of pixels or points) tagged with GPS coordinates (or coordinates in another geographic coordinate system elected by the user), the GPS tags accurate within a tolerance set by the user, and the visual representation of the ground area captured in the map accurate within a time threshold set by the user. A map thus generated through the second method S200 can be suitable for survey of the ground area and/or remote distance measurement of structures or artifacts within the ground area.

The second method S200 can also generate flight paths over a contiguous ground area for UAVs in several different (e.g., asynchronous) missions in one campaign and then assemble images captured by UAVs across the various missions within the campaign into a single geospatial map of the contiguous ground area. Furthermore, for a limited number of UAVs in a particular area, the second method S200 can queue missions within a campaign, such as based on micro-weather (e.g., wind) conditions within a selected ground area; the second method S200 can also queue missions within a campaign and campaigns within a series of ordered campaigns according to the urgency (e.g., a time requirement) of a geospatial map corresponding to each mission and/or to each campaign.

Like the first method S100 described above, Blocks of the second method S200 can execute on a computer network (e.g., a remote server), on a computing device (e.g., a smartphone, a tablet, a desktop computer) connected to the computer network, or on a computing device in direct communication within one or more UAVs, etc.

3.1 Parameter Selection

Block S210 of the second method S200 recites, within a user interface, receiving a selection for a set of interest points on a digital map of a physical area and receiving a selection for a resolution of a geospatial map in Block S210. As described above and below, Block S210 can also receive selection for a mission type, a resolution, a time accuracy, a position accuracy, and/or a geographic coordinate system of a geospatial map, and/or for any other parameter relevant to capturing images for or generating a geospatial map.

In one implementation, Block S210 collects any of the foregoing parameters through a user interface accessed through a computing device, such as a smartphone or a desktop computer. For example, Block S210 can collect these parameters through a digital control panel presented to a user through a native geospatial map-ordering application, executing on a smartphone. In another example, Block S210 can collect these parameters through a map-ordering interface within a web browser executing on a tablet or a laptop computer.

Like Block S110 described above, Block S210 can receive a set of points selected on a digital map rendered within the user interface and then generate a polygon with vertices at each point on the map to define the area of interest to be imaged. For example, the user can drag a series of (e.g., three or more) points onto the digital map or click directly onto the map to define the set of interest points. Alternatively, the user can type a set of geographic coordinates (e.g., GPS coordinates) directly into a text field or upload a file containing geographic coordinates into the user interface.

In one variation, Block S2100 receives—through the user interface—a mission type that specifies a structural survey and/or a land area survey. In this variation, Block S260 can handle this selection by applying ground control points proximal the ground area to images collected by the UAVs to geographically align the geospatial map. For example, Block S2100 can prompt the user—within the user interface—to select a radio button or digital toggle switch corresponding to one of the mission types and then pass this selection to Block S250.

Block S210 also receives a resolution of the geospatial map to be generated with images captured by a UAV in a subsequent mission. For example, Block S210 can prompt the user to enter a maximum linear distance corresponding to a single pixel in the geospatial map, such as at three centimeters per pixel or one meter per pixel. Block S210 can similarly prompt the user to select a radio button or move a slider bar to a position corresponding to a particular map resolution.

In one variation, Block S210 also receives a time accuracy selection for the geospatial map. For example, Block S210 can prompt the user to enter a maximum age (i.e., a time from a current date) of previous (i.e., stored) images that may be applied to the geospatial map. In particular, in this example, Block S260 can identify a former image captured over a portion of the ground area at previous time, and Block S220 can compare the age of the former image to the selected time accuracy and reduce the size of the ground area to be imaged for the geospatial map if the former image satisfies the selected time accuracy requirement (and the resolution requirement, etc.), thereby reducing a number of images that must be captured during the mission to generate the geospatial map that meets the user's specifications (and thus reducing cost and/or time required to generate the geospatial map).

In one variation, Block S210 also receives a position accuracy of the geospatial map—that is, a distance difference (e.g., in centimeters) between a geographic coordinate labeled on the geospatial map and a true (e.g., "exact") geographic coordinate of the corresponding physical point on the geospatial map. For example, Block S210 can prompt the user to enter a maximum distance tolerance between a real geographic point and a point on the map in a percentage (e.g., 10% of a distance dimension corresponding to one pixel in the map) or in an absolute value (e.g., one meter), which defines a bound on accuracy of geographic location of mapped points in the geospatial map. In this variation, Block S230 can set an image capture rate at the UAV and/or an image density for the mission to achieve an image overlap to realize the position accuracy selected by the user. In particular, increased image overlap can increase position accuracy of images stitched together into the geospatial map, and Block S230 can adjust the target overlap between images captured at (longitudinally and laterally) adjacent positions over the ground area.

In yet another variation, Block S210 receives a geographic coordinate system of a geospatial map. For example, Block S210 can prompt the user to select a final geographic coordinate system for the geospatial map, such as Universal Transverse Mercator (UTM), Universal Polar Stereographic (UPS), GLONASS, CA State Plane, NAD83, Galileo, Indian Regional Navigational Satellite System (IRNSS), or BeiDou Navigation Satellite System (BDS), and Block S260 can implement this selection by converting coordinates tagged to pixels in the map from a default geographic coordinate system (e.g., GPS) into the user-elected geographic coordinate system.

However, Block S210 can collect or receive these and any other parameter relevant to the mission and to the geospatial map in any other suitable way and through any other suitable type of user interface accessible on any other suitable device.

3.2 Ground Area

Block S220 of the second method S200 recites identifying a ground area corresponding to the set of interest points for imaging during a mission. Generally, Block S220 functions like Block S110 described above to map interest point selections received in Block S210 to a physical area (i.e., the area of interest, the ground area) on Earth.

In one implementation, Block S210 receives a selection of three (or more) points entered into the user interface, and Block S220 maps each point to a geographic coordinate, converts the points into vertices of a polygon (based on an order of entry of the interest points or a minimum distances between interest points), and passes a geographic definition of the polygon to Block S230 for generation of the geospatial map.

In another implementation, Block S210 receives a selection of two points entered into the user interface, and Block S220 maps each point to a geographic coordinate, defines a rectangular area of interest between the points with a preset area width, and passes a geographic definition of the rectangular area of interest to Block S230 for generation of the geospatial map.

However, Block S220 can function in any other way to map one or more points selected by the user within the interface to an area on the Earth to image.

3.4 Flight Path

Block S230 of the second method S200 recites generating a flight path over the ground area for execution by an (e.g., a first) unmanned aerial vehicle during the mission. Generally, Block S230 functions like Block S130 described above to generate a flight path for subsequent execution by the UAV. For example, Block S230 can generate the flight path that defines a series of straight paths covering the ground area and connected by a series of turns. Block S230 can also generate the flight path that defines a minimum of turns to completely image the ground area.

Block S230 can also account for a common or forecast weather condition at the site of the area of interest, such as wind speed and direction, and generate the flight path that accommodates this weather condition. For example, if wind typically moves over the ground area in an easterly direction between twenty-five and thirty-five miles per hour, Block S230 can generate the flight path that defines linear paths directed at an angle toward the east, such as at a compass bearing of 45° to move the UAV approximately due north and a compass bearing of 135° to move the UAV approximately due south for the UAV with a target cruise speed of thirty miles per hour, and such as at a compass bearing of 30° to move the UAV approximately due north and a compass bearing of 150° to move the UAV approximately due south for the UAV with a target cruise speed of sixty miles per hour.

Block S230 can also account for imaging capabilities of the UAV selected or allocated for the mission when generating the flight path, such as zoom, focus, resolution, sharpness, image quality, and/or image range capabilities of the UAV. For example, Block S230 can receive a flight altitude from Block S240, define a target spacing between legs (i.e., linear paths) of the flight path based on a ground area that can be imaged (without significant optical aberration) by a camera within the UAV at the target altitude, and generate the flight path accordingly.

As described above, Block S260 can also retrieve images of the ground area captured previously and fulfilling a time accuracy requirement set by the user, and Block S220 can remove a subregion of the ground area corresponding to the previous images, and Block S230 can thus generate the flight path for the UAV that substantially avoids the subregion, thereby reducing flight time and/or image load (and therefore cost) for the mission.

Block S230 can also generate multiple flight paths for the UAV, such as a primary flight path to be executed by the UAV under common or anticipated flight conditions (e.g., weather, wind speed, wind direction, precipitation, light level, cloud cover, etc.) and a secondary flight path to be executed by the UAV if flight conditions just before or during the mission significantly differ from the common or anticipated fight conditions.

Block S230 can similarly generate one flight path that defines multiple takeoff and/or landing paths for the UAV, as shown in FIG. 6. For example, Block S230 can define a first landing path and a second landing path at one landing site within or near the ground area, wherein the first landing path is associated with a first local wind condition at the ground area, and wherein the second landing path is associated with a second local wind condition at the ground area different from the first local wind condition. Furthermore, in this example, Block S230 can select the landing site for the UAV from a previous geospatial map generated from images captured in a previous mission, identify an obstruction proximal the landing site from the previous geospatial map, and define the first landing path and the second landing path that avoid the obstruction. Thus, in this example, one or more sensors at a control station and/or within the UAV can test a local wind condition near the landing site just before the mission, during the mission, or upon the UAV's final approach to the landing site, and the control station or the UAV can elect one of the pre-programmed landing paths according to the detected wind condition. However, Block S230 can generate any other number of landing paths for the selected landing site and associated with any other local condition such that the UAV can be preprogrammed with various landing options for the mission. The UAV can thus selectively execute one of the landing paths for the landing site according to a condition tested at the UAV or a local station soon before, during, or near the end of the mission.

Block S230 can also define multiple landing sites within or near the ground area and assign one or more landing paths and triggers (i.e., conditions) for each landing site. Block S230 can similarly define one or more takeoff locations within or near the ground area as well as one or more takeoff paths and triggers for each takeoff site. Block S230 can also specify one takeoff site and one landing site that are physically coextensive (i.e., that are at the same location) such that the UAV may takeoff and land at the same location.

In one variation, Block S230 further generates a second flight path over a second portion of the ground area for execution by a second unmanned aerial vehicle during the mission. Generally, in this variation, Block S230 can implement similar methods or techniques as described above to generate a second flight path for a second UAV as for the (first) UAV, wherein the (first) flight path for the first UAV and the second flight path for the second UAV designate a different area of the ground to image, thereby sharing mission load (e.g., a total number of images of the ground area to be captured) across multiple UAVs. In particular, Block S230 can generate the first flight path over a first portion of the ground area for execution by the first UAV during the mission and the second flight path over a second portion of the ground area for execution by the second unmanned aerial vehicle during the mission.

In one implementation, Block S230 generates the first flight path that guides the first UAV over a first region of the ground area and generates the second flight path that guides the second UAV over a second region of the ground area, wherein the first region intersects the second region across an overlap region. Thus, in this implementation, Block S260 can stitch a first set of images captured by the first UAV and a second set of images captured by the second UAV during the mission into the geospatial map by aligning a subset of images in the first set of images corresponding to the overlap region with a subset of images in the second set of images corresponding to the overlap region. Thus, Block S230 can generate multiple flight paths over overlapping (i.e., intersecting) regions of the ground area to aid aggregation of images collected by various UAVs during the mission into a single geospatial map in Block S260.

Block S230 can also select a takeoff site and a landing site that are common to the flight paths for the first and second UAVs. For example, Block S230 can specify a takeoff and a landing order for the first and second UAVs such that the first and second UAVs consecutively execute the same takeoff and landing paths or selectively execute a takeoff and landing path based on local conditions at the time each is launched. Alternatively, Block S230 can define different and non-intersecting takeoff and landing paths for the first and second UAVs such that the UAVs can takeoff and land at approximately the same times rather than consecutively. Block S230 can therefore define also multiple takeoff and/or landing paths for the second UAV, wherein each takeoff and landing path is associated with a particular local condition (or range of conditions) such as wind speed and/or direction, at the takeoff and landing sites, respectively.

3.5 Altitude

Block S240 of the second method S200 recites setting an altitude for the unmanned aerial vehicle along the flight path based on the selection for the resolution of the geospatial map and an optical system arranged within the unmanned aerial vehicle. Generally, Block S240 functions to specify a target altitude for the unmanned aerial vehicle during the flight path to achieve the map resolution selected by the user. In particular, Block S240 combines image capture capabilities of the UAV with the map resolution requirement to set a target elevation above the area of interest at which to capture the set of images with the UAV.

In one implementation, Block S240 can access image capture and optical capabilities of the UAV, such as (pixel) resolution, zoom, focus, sharpness, image quality, optical distortion from lenses, and/or geometry of the camera (e.g., CMOS) sensor, and combines any one or more of these variables (e.g., specific to the UAV or common to the UAV make and/or model) with the map resolution requirement to calculate the target altitude for image capture at the UAV during the mission. For example, Block S130 can select the UAV that includes a three-megapixel (3MP) camera capable of capturing images 2,048 pixels wide and 1,536 pixels tall and featuring a lens of a substantially fixed angle of view (e.g., a "fixed" zoom with mechanical focus), and Block S210 can receive a map resolution requirement specifying ten centimeters per pixel. In this example, Block S240 can set a usable image size of an image captured with the UAV at 800 pixels wide and 600 pixels tall to account for optical distortion at the periphery of the image (e.g., due to lens effects) near an altitude required to capture ten centimeters per pixel at the camera and cooperatively set the target image capture altitude for the UAV at 400 meters above the ground area based on the "fixed" zoom position of the camera. In a similar example, for the same UAV including a 3MP camera and a map resolution requirement of one centimeter per pixel, Block S240 can set the usable image size of an image captured with the UAV at 1,600 pixels wide and 1,200 pixels tall to account for optical distortion at the periphery of the image near an altitude required to capture one centimeter per pixel at the camera and cooperatively set the target image capture altitude for the UAV at twenty meters above the ground area. In these examples, Block S240 can input the map resolution requirement (and other imaging capabilities of the UAV) into an algorithm that outputs target image capture height for the UAV to achieve the resolution requirement and/or image cropping parameters (e.g., a maximum cropped image size in square pixels) to eliminate optically distorted regions of images from the geospatial map.

In the foregoing implementation, Block S240 can further calculate a linear depth (e.g., length) dimension and linear width dimension of the ground area than can be imaged (without substantial optical distortion) by the camera within the UAV at the target. In the foregoing example in which Block S240 sets the usable size of an image at 800 pixels wide and 600 pixels tall for a resolution requirement of one meter per pixel, Block S240 can determine that the usable imaged area of the ground area is 800 meters by 600 meters. Block S240 can then pass these values to Block S230 to set a width between linear (e.g., parallel and offset) paths defined within the flight path. As in the foregoing example, Block S230 can set a distance between linear paths at 400 meters to achieve an overlap of 100 meters (or ~17%) between images captured along adjacent linear paths during the mission commensurate with the position accuracy selected by the user in Block S210. Block S230 can also implement these data calculated in Block S230 and the target image overlap to set a (longitudinal) traverse distance of the UAV between capture of subsequent image. As in the foregoing example, Block S230 can specify image capture, with every 600 meters traversed forward by the UAV along its flight path during the mission, to achieve the overlap of 100 meters of the ground area captured in sequential images. Alternatively, Block S230 can access a typical flight speed (or set a target flight speed) for the UAV and set an image capture rate according to the flight speed and the target image overlap. As in the foregoing example, for a target flight speed of twenty meters per second, Block S230 can set an image capture rate of one image every thirty seconds to achieve the overlap of 100 meters of the ground area captured in sequential images. However, Blocks S230 and S240 can cooperate in any other way to set the lateral and longitudinal ground distances traversed between sequential image captures.

Block S240 can also apply a factor of safety to the target altitude for the UAV, such as to substantially eliminate a possibly that images captured during the mission cannot be stitched into the geospatial map that meets the map resolution requirement received in Block S210. As in the foregoing example, Block S240 can apply a factor of safety of 1.2 to selection of the target altitude for the UAV during the mission by shifting the target altitude from 400 meters to 330 meters, thereby increasing a projected resolution of images captured by the UAV during the mission from one meter per pixel to approximately eighty-three centimeters per pixel. Block S230 can similarly apply a factor of safety to the image overlap target, to the (maximum) ground distance between adjacent paths flown by the UAV during the mission, and/or to the image capture rate or traverse distance between consecutive images captured by the UAV during the mission.

Block S240 can also convert the altitude above the ground area to altitude above sea level. For example, Block S230 can set points or zones at which each image is captured over the ground area by the UAV during the mission, and Block S240 can access a two-dimensional or three-dimensional topographic map of the ground area indicating altitudes of earth within the ground area, calculate an average altitude above sea level around each point or zone, and then add the target altitude over the ground area to the average altitude above sea level for each point or zone to generate sea level-based altitude targets along the flight path. Thus, Block S230 and S240 can cooperate to generate a three-dimensional flight path for the UAV to enable image capture at a substantially consistent vertical distance over the area of interest during the mission.

In the variation in which Block S230 generates a second flight path for a second UAV, Block S240 can similarly set a second altitude for the second unmanned aerial vehicle along the second flight path based on the selection for the resolution of the geospatial map and an optical system arranged within the second unmanned aerial vehicle. In this variation, Block S240 can also cooperate with Block S230 to generate a second three-dimensional flight path for the second UAV to enable image capture at a substantially consistent vertical distance over a subregion of the area of interest during the mission.

Furthermore, Blocks S230 and S240 can cooperate to generate any number of three-dimensional flights paths (or two-dimensional flight paths and target elevations) for any number of UAVs assigned to a mission or to a campaign. However, Block S230 can generate a flight path and Block S240 can set a target image capture altitude for one or more UAVs in any other suitable way.

3.6 Geospatial Map

Block S260 of the second method S200 recites stitching a first set of images captured by the (first) UAV during the mission into the geospatial map in Block S260. In the variation in which the second method S200 generates flight paths for multiple UAVs, Block S260 can further include stitching a first set of images captured by the (first) UAV and a second set of images captured by the second UAV during the mission into the geospatial map. Generally, Block S260 functions to collect images captured by one or more UAVs during a mission and/or during a campaign and to assemble (e.g., aggregate) the images into an orthorectified geospatially-accurate visual map (or into three-dimensional geospatially accurate point cloud) of the selected area of interest.

Block S260 can retrieve the images from a database on which images captured by the UAV(s) are stored such as from a remote server connected to the computer network or from local memory on the user's computing device or local control station near the ground area. Alternatively, Block S260 can handle downloading the images directly from the UAV(s), such as upon completion of the mission when the UAV is brought within wireless (e.g., Wi-Fi) range of the computing device executing Block S260, as described below.

As described above, in one variation of the second method S200, Block S210 receives a selection for a mission type within the user interface. In this variation, the second method S200 can further include Block S250, which recites setting a geospatial accuracy requirement for the mission based on the selection for the mission type, and Block S260 can assemble the set of images captured by the UAV during the mission into the geospatial map based on the geospatial accuracy requirement.

In one implementation of the foregoing variation, Block S210 receives the mission type that specifies a structural survey and a selection for a set of interest points that specifies an address of a structure. In this implementation, Block S220 can select a coordinate in a geospatial coordinate system that corresponds to the address of the structure provided by the user, and Block S250 can disable a ground control point requirement for the mission based on the selection for the structural survey. Thus, Block S260 can skip a step of tying the geospatial map—assembled from images captured by the UAV (or multiple UAVs) during the mission—to ground control points, which can decrease a processing requirement (e.g., time, power) for the images and thus decrease a cost of generating the geospatial map. In this implementation, Block S250 can thus eliminate application of real ground control points to the geospatial map, which reduces accuracy of mapping points (e.g., pixels) in the geospatial map onto real locations. However, for surveying one or more structures—such as homes, parking lots, and/or commercial structures, etc.—a geospatially-accurate map may be unnecessary to capture relevant or desired information of the structure(s), and Block S250 can thus toggle application of ground control points to the generation of the geospatial map in Block S260 to reduce cost (e.g., time, processing power) of generating the geospatial map without sacrificing relevant or desired information captured in the geospatial map.

In another implementation of the foregoing variation, Block S210 receives the mission type that specifies a land area survey and a selection of three interest points on the digital map displayed within the user interface. In this implementation, Block S220 selects a polygonal land area bounded by the three interest points, and Block S250 selects a ground control point within the ground area and passes this ground control point to Block S260, which applies the ground control point to the geospatial map to align a feature within the map to a real point on the Earth, thereby increasing geospatial accuracy of the geospatial map—that is, increasing the accuracy of mapping pixels in the geospatial map to real points (e.g., GPS coordinates) on the Earth.

Furthermore, in this implementation, Block S210 can receive a selection for an accuracy of the geospatial map within the user interface, as described above, and Block S250 can select a number of ground control points within the ground area based on the selected accuracy of the geospatial map. In particular, Block S210 can prompt the user to select an accuracy of the geographic coordinate tagged to each pixel (or group of pixels) in the geospatial map. For example, Block S210 can prompt the user to move a slider bar to set a maximum geographic location tolerance in centimeters per pixel for each pixel in the geospatial map, and Block S250 can calculate a number of ground control points necessary to achieve the maximum geographic location tolerance selected by the user. In a similar example, Block S210 can prompt the user to select a radio button for one of a preset list of maximum geographic location tolerances for each pixel (or group of pixels) in the geospatial map, and Block S250 pass a number of ground control points corresponding to the selected maximum geographic location tolerance to Block S260. Block S250 can additionally or alternatively select known ground control points within or proximal the ground area selected for imaging, such as one or more GPS coordinates, coordinates in another geographic coordinate system, or physical markers located within or near the selected ground area.

In the foregoing implementation, Block S260 can then pair a portion of one image (e.g., an orthorectified image) in the set of images to one ground control point received from Block S250 to geographically locate the image in the geospatial map. For example, Block S260 can retrieve an orientation and a GPS coordinate of the ground control point, select a particular image—from the set of images captured at the UAV during the mission—that is tagged with a GPS coordinate (as described above) substantially near the GPS coordinate of the ground control point, implement a machine vision technique to correlate a portion of the particular image with the ground control point, align the portion of the particular image (in translation and rotation) with the ground control point, and finally scale the portion of the particular image to the ground control point, thereby geospatially locating, aligning, and scaling the particular image to a corresponding geographic area. Block S260 can similarly geospatially locate, align, and/or scale other images—in the set of images—that include image data of other ground control points set in Block S250, and Block S260 can then insert other images in the set of images around these geospatially-located, -aligned, and/or -scaled images to create a geospatially-accurate visual map of the ground area from images captured by the UAV during the mission.

Furthermore, in the variation of the second method S200 in which Blocks S230 and S240 cooperate to generate flight paths for multiple UAVs, Block S260 can similarly assemble images from various sets of images captured by various UAVs during the mission (or various missions within a campaign) into the geospatially-accurate visual map by locating, orienting, and/or scaling particular images within various image sets onto one or more ground control points, as described above. Block S260 can also combine two different sets of images captured by two different UAVs during a mission by aligning a subset of images in a first set of images captured over a designated overlap region (described above) with a subset of images in a second set of images also captured over the designated overlap region.

In yet another variation, Block S210 includes, within the user interface, receiving a time accuracy for the geospatial map, Block S220 selects the ground area within an area bounded by the set of interest points and not associated with images stored from a previous mission completed within a threshold period of time specified by the time accuracy, and Block S130 plots a flight path over the portion of the ground area for which images that meet the time accuracy requirement are not available, as described above. In this variation, Block S260 can retrieve one or more images stored from a previous mission, intersecting the ground area, and captured in a previous mission within a period of time from current that satisfies the time accuracy requirement, and Block S260 combines these stored images within images captured by the UAV during the current mission to generate the geospatial map. Block S260 can thus aggregate images captured over various missions or campaigns (i.e., in different periods of time) into the geospatial map of the selected ground area.

As described above, the UAV can capture a set of images during the mission and tag each image in the set with a time the image was captured and/or a geographic coordinate in a geographic coordinate system (e.g., a GPS coordinate), an orientation (e.g., pitch, yaw, roll), and/or altitude of the UAV at the time the image was captured. Block S260 can thus manipulate these image meta data to orthorectify and to arrange the images within the geospatial map (or three-dimensional point cloud). Block S260 can also distribute these data to pixels within the geospatial map such that every pixel, every group of pixels, or at least a subset of pixels within the geospatial map is tagged with a time of relevance, a geographic position (interpreted from the geographic location of the UAV), and/or orientation and location data of the UAV that captured the visual representation of the ground area corresponding to the pixel or group of pixels. Thus, a user subsequently interfacing with the geospatial map can identify timeliness and geographic locations of visual data (i.e., pixels) within the geographic map by selecting corresponding pixels or groups of pixels.

Furthermore, in the foregoing variation, Block S210 can receive a selection for a particular geographic coordinate system for the geospatial map, such as Universal Transverse Mercator (UTM), Universal Polar Stereographic (UPS), GLONASS, Galileo, Calif. State Plane, NAD83, Indian Regional Navigational Satellite System (IRNSS), BeiDou Navigation Satellite System (BDS), or any other navigational or geographic coordinate system. In this variation, Block S260 can implement a default geographic coordinate system, such as GPS, to generate the geospatial visual map and to tag one or more pixels or groups of pixels with its geographic coordinate in GPS. Block S260 can then convert each geographic coordinate in the default geographic coordinate system into the user-elected coordinate system before shipping, transmitting, or otherwise enabling access to the completed orthorectified geospatially-accurate visual map.

Block S160 can additionally or alternatively pass the set of images from the UAV(s)—with accompanying data and parameters—to a third party mapping service for assembly into the orthorectified geospatially-accurate visual map. Block S160 can then include distributing the map to a client or customer, such as by transmitting a digital map file to the client over a computer network.

4. Third Method

Figure 7:
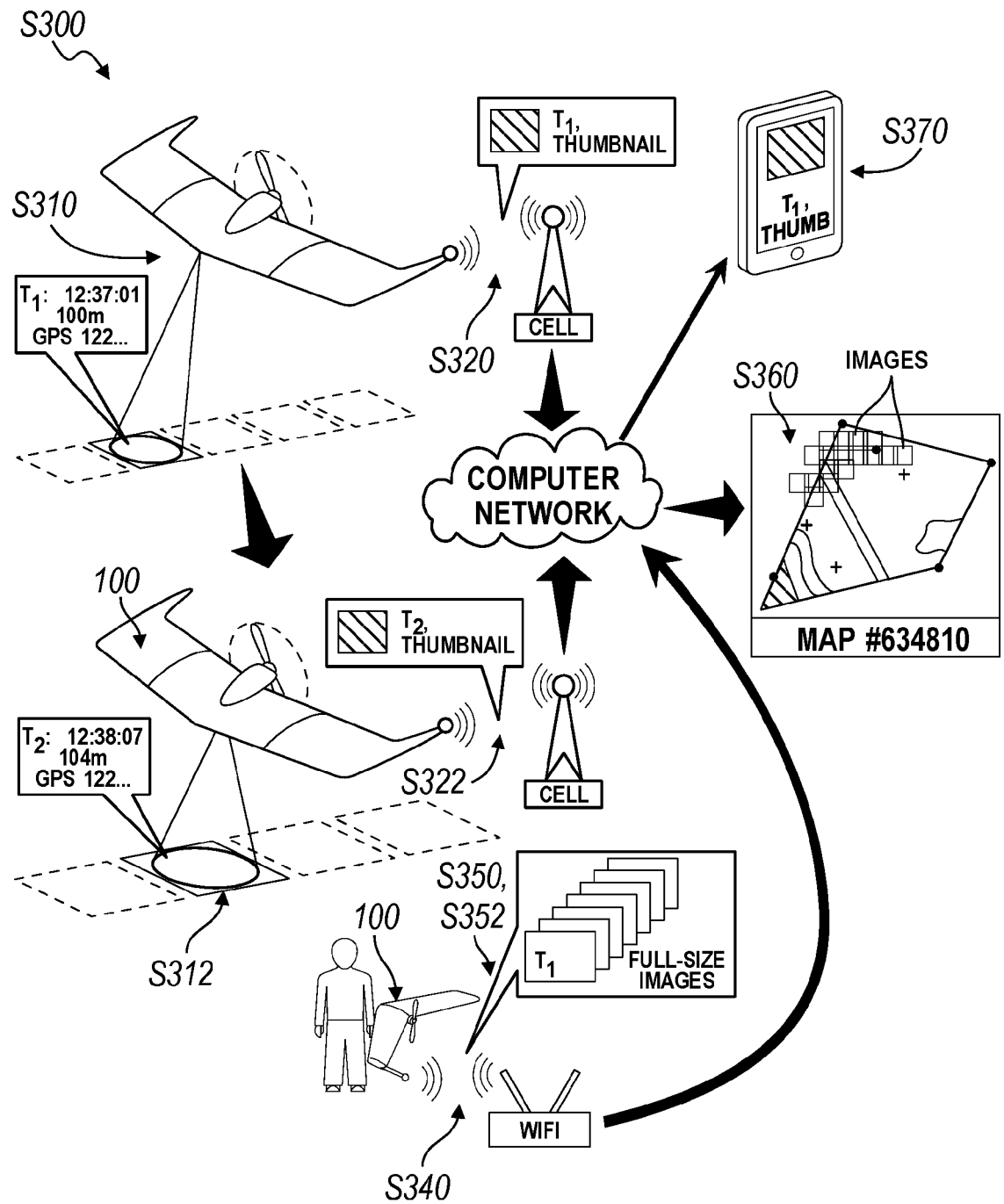
FIG. 7 is a flowchart representation of a third method of one embodiment of the invention.

As shown in FIG. 7, a third method S300 for aerial imaging includes: at a UAV, capturing a first image in a series of images of a preset ground area during a mission in Block S310; in response to capturing the first image, uploading a first image file of the first image to a computer network over a first wireless communication protocol in Block S320; at the UAV, capturing a second image in the series of images during the mission in Block S312; in response to capturing the second image, uploading a first image file of the second image to the computer network over the first wireless communication protocol in Block S322; in response to completion of the mission, detecting access to a second wireless communication protocol in Block S340; uploading a second image file of the first image and a second image file of the second image to the computer network over the second wireless communication protocol in Block S350, the second image file of the first image of a greater resolution than the first image file of the first image, and the second image file of the second image of a greater resolution than the first image file of the second image; and stitching the second image file of the first image and the second image file of the second image into a geospatial map of the preset ground area in Block S360.

Generally, the third method S300 functions to offload two different versions of an image captured by a UAV during a mission over a ground area, wherein a first version of the image is of a first file size (e.g., a compressed image file, an image of a reduced size, a low-quality version of the image) uploaded over a first communication protocol that is data-sensitive but highly accessible, such as a cellular network, and wherein a second version of the image is of a second file size (e.g., a RAW image file) greater than the first file size and uploaded over a second communication protocol that supports intensive data transfer but is only intermittently accessible, such as a Wi-Fi network. For example, the third method S300 can function to upload a thumbnail version of an image captured by the UAV over a cellular network during a mission substantially in real-time, thereby enabling a user to access visual data of the ground area collected by the UAV—such as through the user interface described above—substantially in real-time. The user can thus access the images to check that mission (e.g., imaging, location) parameters are being met by the UAV as the UAV executes the mission and to then edit the mission or mission parameters as the mission is in progress if the thumbnail image suggests a less than desired mission outcome, indicates a different point of interest within the ground area, etc. Furthermore, in this example, when the mission is completed, the third method S300 can upload the full-sized (e.g., RAW) version of the image to a database, a remote server, or a local control station, as described above. Once the full-sized image and other images captured during the mission are downloaded from the UAV, the third method S300 can implement methods or techniques described above to assemble the full-size images into an orthorectified geospatial visual map.

4.1 Image Capture

Block S310 of the third method S300 recites, at a UAV, capturing a first image in a series of images of a preset ground area during a mission, and Block S312 of the third method S300 recites, at the UAV, capturing a second image in the series of images during the mission. Generally, Blocks S310 and S312 execute on the UAV or on a (mobile) computing device arranged within the UAV to capture digital photographic (or infrared or other) images of the ground area during the mission, such as in .JPEG or .TIFF file formats. For example, Blocks S310 and S312 can cooperate to capture images at a preset rate during the mission, such as by capturing one image every fifteen seconds or by capturing one image for every too meters of ground area traversed. Alternatively, Blocks S310 and S312 can cooperate to capture images at predefined checkpoints during the mission. However, Block S310 and S312 can capture any other type of images of the ground area at any other rate or according to any other trigger.

4.2 Real-Time Image Offloading

Block S320 of the third method S300 recites, in response to capturing the first image, uploading a first image file of the first image to a computer network over a first wireless communication protocol, and Block S322 of the third method S300 recites, in response to capturing the second image, uploading a first image file of the second image to the computer network over the first wireless communication protocol. Generally, Blocks S320 functions to—during the mission—upload versions of the first and second images that are of reduced file size to a local or remote database that is accessible by a user to review an imaging status of the mission substantially in real-time. For example, substantially immediately after the UAV (or the mobile computing device within the UAV) captures the first image, Block S320 can upload a thumbnail version of the first image to a computer network over cellular communication protocol. Similarly, once the UAV captures the second image, Block S322 can upload a thumbnail version of the second image to the computer network over cellular communication protocol. In particular, as in this example, because a cellular network may be commonly available even in relatively remote areas, Blocks S320 and S322 can upload images from the UAV to the computer network or image database substantially in real-time (i.e., while in flight during the mission). However, because such a cellular network may not support high data loads necessary to offload full-size, high-resolution, digital color images from the UAV—or because such intensive data transfer may be relatively expensive—Blocks S320 and S322 can compress, crop, or otherwise reduce the size of the first and second images, respectively, before transmitting the images over the cellular network. However, Blocks S320 and S322 can offload reduced file-size images from the UAV to a local or remote image database over any other communication protocol during the mission.

Blocks S320 and S322 can similarly cooperate to upload compressed, lower-density, or limited flight data to the computer network during the flight. For example, Block S320 and S322 can upload GPS location, pitch, yaw, and roll of the UAV to the computer network over cellular communication protocol at a rate of five Hertz (5 Hz) throughout the flight and/or paired with each uploaded thumbnail image. However, a memory module within the UAV can store GPS location, pitch, yaw, and roll of the UAV captured at a higher sampling rate, such as 60 Hz (e.g., by an onboard GPS module), and Blocks S350 can offload this complete or higher-density flight data to the computer network once the flight is completed and the UAV is moved (manually) near a wireless communication link, such as a wireless router, as described below. However, Blocks S320 and S322 can offload compressed or limited flight data from the UAV to a local or remote image and/or flight database over any other communication protocol during the mission.

As shown in FIG. 7, one variation of the third method S300 includes Block S370, which recites enabling visual access to the first image file of the first image, substantially in real-time with capture of the first image, through a computing device in communication with the computer network. Thus, Block S370 can enable the thumbnail images captured at the UAV and relayed to the image database substantially in real-time to be reviewed by a (human) user to check the status of the mission and/or to manually adjust or override mission parameters based on real visual data collected by the UAV during the mission. Additionally or alternatively, a computing device in communication with the image database can implement machine vision to automatically review the images and to automatically set or adjust parameters of the mission accordingly substantially in real time. Block S370 can also enable access to the limited or compressed flight data of the UAV received in Blocks S320 and S322. For example, Block S370 can display a GPS location of the UAV paired with each thumbnail image displayed with a user interface accessible on a computing device such that a user can track a position on the UAV during the flight. In this example, Block S170 can align thumbnail images received from the UAV over an existing geospatial map based on GPS, pitch, yaw, and/or roll data recorded at the UAV when each of the corresponding images was captured. However, Block S370 can provide access to thumbnail images and low-density UAV position data for a user substantially in real-time in any other suitable way.

4.3 Asynchronous Image Offloading

Block S340 of the third method S300 recites, in response to completion of the mission, detecting access to a second wireless communication protocol. Block S350 of the third method S300 recites uploading a second image file of the first image and a second image file of the second image to the computer network over the second wireless communication protocol, the second image file of the first image of a greater resolution than the first image file of the first image, and the second image file of the second image of a greater resolution than the first image file of the second image.

Generally, Block S340 functions to determine that the UAV is within range of a second wireless network that supports more intensive data transfer, such as Wi-Fi, and to trigger Block S350 and S352 (executing on the UAV or the mobile computing device installed within the UAV) to upload larger (e.g., full-size, RAW) images to the computer network for subsequent assembly into the orthorectified geospatially-accurate visual map. For example, once the mission is completed, a user can pack up the UAV and bring the UAV back to a storage facility outfitted with a Wi-Fi router. In this example, Block S240—executing on the UAV—can automatically detect the Wi-Fi router once the UAV is within range, and Blocks S350 and S352 can automatically transfer full-size images captured during the most recent mission(s) to the same or other image database via the Wi-Fi router accordingly.

Blocks S350 and S352 can also upload higher-density flight data of the UAV to the computer network upon completion of the flight. For example, the UAV can record GPS location, pitch, yaw, and roll of the UAV with corresponding timestamps and store these data locally in memory within the UAV during the flight, such as at a rate of sixty Hertz (60 HZ)—which can compressed and transmitted to the computer network during the flight in Blocks S320 and S322—and Blocks S350 and S352 can then upload the complete 60 Hz-sample rate UAV position and time data to the computer network over Wi-Fi (or other high density wireless communication protocol) once the flight is completed.

Block S340 can therefore trigger Blocks S350 and S352 to upload full-size and/or high(er)-resolution versions of the first and second images and/or higher-density UAV position data (e.g., image meta data) to a local or remote database via a second wireless communication protocol that supports more intensive data transfer (or supports more intensive data transfer at reduced cost) than the first wireless communication protocol but that may be less accessible in certain (e.g., remote) locations.

As described above, Blocks S320, S322, S350, and/or S352 can also upload images that are tagged with corresponding meta data, such as a time of capture of the image and a three-dimensional location coordinate and an orientation (e.g., pitch, yaw, roll) of the UAV at the time the image was captured.

However, Blocks S340, S350, and S352 can cooperate in any other way to asynchronously upload high(er)-resolution images captured during the completed mission to an image database for subsequent assembly into the orthorectified geospatially-accurate visual map.

4.4 Orthorectified Geospatially-Accurate Visual Map

Block S360 of the third method S300 recites stitching the second image file of the first image and the second image file of the second image into a geospatial map of the preset ground area. Generally, Block S360 implements method or techniques of Block S260 described above to generate an orthorectified geospatially-accurate visual map. For example, Block S360 can generate a geospatial map based on three-dimensional location coordinates of the UAV at times of capture of each image collected during the mission, and Block S360 can tag each pixel in the image with the time and UAV location at which each image used to assemble the map was taken. However, Block S360 can function in any other way to generate the geospatial map of the ground area.

The UAV(s) can also capture images of structures (parking lots, oil pipelines), buildings (e.g., skyscrapers), bodies of water (e.g., lakes, oceans), etc. and the third method S300 can assemble the images into orthorectified geospatially-accurate visual maps of the structures, buildings, bodies of water, etc.

The UAV and methods of the invention can be embodied and/or implemented at least in part as a machine configured to receive a computer-readable medium storing computer-readable instructions. The instructions can be executed by computer-executable components integrated with the vehicle, scheduling kiosk(s), a remote scheduling server, hardware/firmware/software elements of a user computer or mobile device, or any suitable combination thereof. Other systems and methods of the invention can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
   at a mobile computing device installed in a first unmanned aerial vehicle:
   downloading a first flight data from a remote computer system;
   uploading the first flight data to an autopilot module arranged in the first unmanned aerial vehicle for execution by the first unmanned aerial vehicle during a mission;
   during the mission, collecting environmental data proximal to the first flight data at a first time;
   during the mission, collecting telemetry data comprising a set of geospatial coordinates of the first unmanned aerial vehicle at the first time;
   coupling the environmental data to the telemetry data within a first data packet; and
   transmitting the first data packet to the remote computer system.

2. The method of claim 1, wherein downloading the first flight data from the remote computer system comprises downloading the first flight data from the remote computer system via a cellular network implementing a long-term evolution (LTE) wireless network standard.

3. The method of claim 1, wherein downloading the first flight data from the remote computer system comprises downloading the first flight data from the remote computer system via a wireless network implementing one of: a third generation (3G) wireless network standard, a fourth generation (4G) wireless network standard, a fifth generation (5G) wireless network standard, and a WiMAX wireless network standard.

4. The method of claim 1, wherein collecting environmental data comprises collecting environmental data comprising a data type selected from a group consisting of: altitude, local barometric pressure, ambient lighting, wind speed, air temperature, atmospheric moisture data, and signal strength of a wireless signal received from a ground-based cellular tower.

5. The method of claim 1, wherein collecting telemetry data comprises collecting telemetry data comprising a data type selected from a group consisting of: an altitude, a battery state of charge, a motor speed, a velocity, a power draw, and an orientation of the first unmanned aerial vehicle.

6. The method of claim 1, wherein collecting telemetry data comprises collecting identification data and geospatial coordinates of each aerial vehicle in a set of aerial vehicles proximal the first unmanned aerial vehicle.

7. The method of claim 1, further comprising:
   at the remote computer system:
   receiving the data packet from the first unmanned aerial vehicle;
   during the mission, generating a second flight data, for execution by the first unmanned aerial vehicle, based on the environmental data and the telemetry data; and during the mission, transmitting the second flight data to the first unmanned aerial vehicle; and at the mobile computing device installed in the first unmanned aerial vehicle:

during the mission, downloading the second flight data from the remote computer system; and during the mission, uploading data from the second flight data, in replacement of the first flight data, to the autopilot module for execution by the first unmanned aerial vehicle.

8. The method of claim 1, further comprising:

during the mission, recording a signal strength of a wireless network at a location occupied by the first unmanned aerial vehicle at the first time; and coupling the signal strength to environmental data and telemetry data, recorded by the first unmanned aerial vehicle at substantially the first time, within the first data packet.

9. A method comprising:

at a first mobile computing device installed in a first unmanned aerial vehicle:

downloading a first flight data from a remote computer system;

uploading the first flight data to an autopilot module arranged in the first unmanned aerial vehicle for execution by the first unmanned aerial vehicle during a mission;

during the mission, recording a first signal strength of a first wireless signal received from the remote computer system via a wireless network at a first time;

in response to a first threshold value exceeding the first signal strength:

collecting telemetry data comprising a set of geospatial coordinates of the first unmanned aerial vehicle at the first time; and coupling the first signal strength to the telemetry data within a first data packet; and transmitting the first data packet to the remote computer system.

10. The method of claim 9, wherein recording the first signal strength comprises recording the first signal strength of a first wireless signal received from the remote computer system via a cellular network implementing a long-term evolution (LTE) wireless network standard.

11. The method of claim 9, wherein transmitting the first data packet to the remote computer system comprises:

during the mission, sampling a second signal strength of a second wireless signal received from the remote computer system at a second time; and in response to the second signal strength exceeding the first threshold value, transmitting the first data packet to the remote computer.

12. The method of claim 9, further comprising:

in response to a second threshold value exceeding the first signal strength, wherein the second threshold value is less than the first threshold value:

identifying a second unmanned aerial vehicle within communicative range of the first unmanned aerial vehicle and in communication with the remote computer system via the wireless network; and transmitting the first data packet to the second unmanned aerial vehicle.

13. The method of claim 9, wherein collecting the telemetry data comprises collecting an identification and a position of each aerial vehicle in a set of aerial vehicles proximal the first flight data of the first unmanned aerial vehicle.

14. The method of claim 12, wherein transmitting the first data packet to the second unmanned aerial vehicle comprises broadcasting a repair status and a battery state of charge of the first unmanned aerial vehicle to the second unmanned aerial vehicle.

15. The method of claim 12, wherein transmitting the first data packet to the remote computer system comprises:

at a second mobile computing device installed in the second unmanned aerial vehicle:

receiving the first data packet from the first unmanned aerial vehicle; and transmitting the first data packet to the remote computer system.

16. The method of claim 12, further comprising, at a second mobile computing device installed in the second unmanned aerial vehicle:

receiving the first data packet from the first unmanned aerial vehicle;

identifying, in the first data packet, receipt by the first unmanned aerial vehicle of the first wireless signal having the first signal strength, wherein the second threshold value exceeds the first signal strength;

confirming a communicative link between the second unmanned aerial vehicle and the remote computer system via the wireless network;

assuming a master setting to control the first unmanned aerial vehicle during execution of the mission; and transmitting a confirmation, via the wireless network, to the remote computer system indicating assumption of the master setting by the second unmanned aerial vehicle over the first unmanned aerial vehicle.

17. The method of claim 16, further comprising:

at the mobile computing device installed in the second unmanned aerial vehicle:

during execution of the first flight data by the first unmanned aerial vehicle, generating a second flight data for execution by the first unmanned aerial vehicle based on the first data packet; and during execution of the first flight data by the first unmanned aerial vehicle, transmitting the second flight data to the first unmanned aerial vehicle; and at the mobile computing device installed in the first unmanned aerial vehicle:

during execution of the first flight data by the first unmanned aerial vehicle, receiving a second flight data from the second unmanned aerial vehicle; and during execution of the first flight data by the first unmanned aerial vehicle, uploading data from the second flight data, in replacement of the first flight data, to the autopilot module for execution by the first unmanned aerial vehicle.

18. The method of claim 16, further comprising:

at the remote computer system:

receiving the first data packet, via the wireless network, from the second unmanned aerial vehicle;

receiving the confirmation, via the wireless network, from the second unmanned aerial vehicle, indicating assumption of the master setting by the second unmanned aerial vehicle;

during execution of the first flight data by the first unmanned aerial vehicle:

generating a second flight data for execution by the first unmanned aerial vehicle based on the first data packet; and transmitting the second flight data to the second unmanned aerial vehicle via the wireless network;

at the mobile computing device installed in the second unmanned aerial vehicle:
   during execution of the first flight data by the first unmanned aerial vehicle, receiving, via the wireless network, the second flight data; and
   during execution of the first flight data by the first unmanned aerial vehicle, transmitting the second flight data to the first unmanned aerial vehicle; and
at the mobile computing device installed in the first unmanned aerial vehicle:
   during execution of the first flight data by the first unmanned aerial vehicle, receiving a second flight data from the second unmanned aerial vehicle; and
   during execution of the first flight data by the first unmanned aerial vehicle, uploading data from the second flight data, in replacement of the first flight data, to the autopilot module for execution by the first unmanned aerial vehicle.

19. The method of claim 18, wherein generating the second flight data for execution by the first unmanned aerial vehicle comprises selecting a landing path for the second flight data based on the first data packet.

20. The method of claim 18, further comprising:
at the remote computer system:
   identifying a third unmanned aerial vehicle executing a third flight data simultaneously with execution of the first flight data by the first unmanned aerial vehicle, the third flight data crossing within a threshold distance of the second flight data;
   generating a fourth flight data for execution by the third unmanned aerial vehicle based on the third flight data; and
   transmitting the fourth flight data for execution by the third unmanned aerial vehicle, via the wireless network, to the second unmanned aerial vehicle;
at the mobile computing system installed in the second unmanned aerial vehicle:
   during execution of the third flight data by the third unmanned aerial vehicle, receiving, via the wireless network, the fourth flight data; and
   during execution of the third flight data by the third unmanned aerial vehicle, transmitting the fourth flight data to the third unmanned aerial vehicle; and
at a mobile computing device installed in the third unmanned aerial vehicle:
   during execution of the third flight data by the third unmanned aerial vehicle, receiving the fourth flight plan from the second unmanned aerial vehicle; and
   during execution of the third flight plan by the third unmanned aerial vehicle, uploading data from the fourth flight plan, in replacement of the third flight plan, to a second autopilot module arranged in the third unmanned aerial vehicle for execution by the third unmanned aerial vehicle.

* * * * *

UNITED STATES PATENT AND TRADEMARK OFFICE
CERTIFICATE OF CORRECTION

PATENT NO. : 9,851,716 B2  
APPLICATION NO. : 15/369774  
DATED : December 26, 2017  
INVENTOR(S) : Bret Kugelmass et al.

Page 1 of 1

It is certified that error appears in the above-identified patent and that said Letters Patent is hereby corrected as shown below:

On the Title Page

Item (72) should read as follows:
Bret Kugelmass, San Francisco, CA (US);
Graham Gibbons, San Francisco, CA (US);
Hao Chen, Emeryville, CA (US)

Signed and Sealed this
Fourteenth Day of April, 2020

Andrei Iancu
*Director of the United States Patent and Trademark Office*